(12) United States Patent
Kojima et al.

(10) Patent No.: US 6,603,619 B1
(45) Date of Patent: Aug. 5, 2003

(54) MAGNETIC STORAGE MEDIUM AND HEAT ASSISTED RECORDING AND REPRODUCTION METHOD

(75) Inventors: Kunio Kojima, Nabari (JP); Yasushi Ogimoto, Noda (JP); Shinzo Sawamura, Nishinomiya (JP); Hiroyuki Katayama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/479,255

(22) Filed: Jan. 7, 2000

(30) Foreign Application Priority Data

Jan. 7, 1999 (JP) .......................................... 11-002270
Jan. 7, 1999 (JP) .......................................... 11-002271

(51) Int. Cl.⁷ .............................. G11B 5/02; G11B 5/03
(52) U.S. Cl. ........................... 360/59; 360/66; 428/694
(58) Field of Search ........................... 360/59, 66, 131; 428/694

(56) References Cited

U.S. PATENT DOCUMENTS

| | | | | |
|---|---|---|---|---|
| 4,878,132 A | * | 10/1989 | Aratani et al. ............... 360/59 |
| 5,656,385 A | * | 8/1997 | Nakajima et al. ........... 360/131 |
| 5,830,589 A | * | 11/1998 | Nishimura ............... 369/13.43 |
| 6,028,824 A | * | 2/2000 | Osato et al. .................... 369/13 |
| 6,333,827 B1 | * | 12/2001 | Hamamoto et al. ......... 369/116 |
| 6,392,832 B1 | * | 5/2002 | Oshiki et al. ................. 360/59 |

FOREIGN PATENT DOCUMENTS

JP    2-636957    4/1997

* cited by examiner

Primary Examiner—Regina N. Holder
(74) Attorney, Agent, or Firm—Edwards & Angell, LLP; David G. Conlin; David A. Tucker

(57) ABSTRACT

A magnetic storage medium includes a magnetic storage medium that exhibits a magnetic compensation temperature specified higher than room temperature to minimize effects of heat generated by a head using magneto-resistance effect. In a heat assisted recording and reproduction method using such a magnetic storage medium, during reproduction, the S/N ratio in a reproduction signal is enhanced by optimizing the bias current applied to the head using magneto-resistance effect. A magnetic storage medium and a heat assisted recording and reproduction method using such a magnetic storage medium whereby information is magnetically recorded and reproduced by heating a read-out domain are offered that enables signal reproduction with a good S/N ratio despite possible use of a head exhibiting magneto-resistance effect.

28 Claims, 21 Drawing Sheets

TEMPERATURE

DISTANCE

FIG.18(a) LIGHT PROJECTED
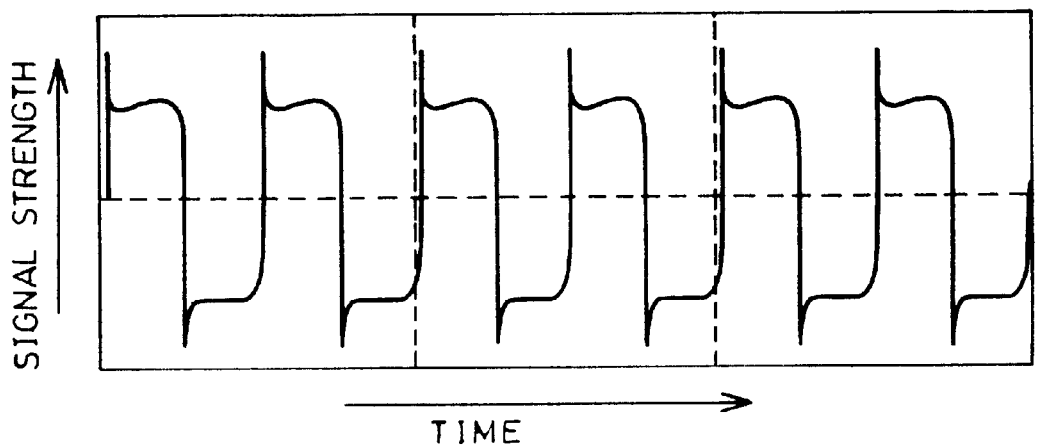
FIG.18(b) NO LIGHT PROJECTED
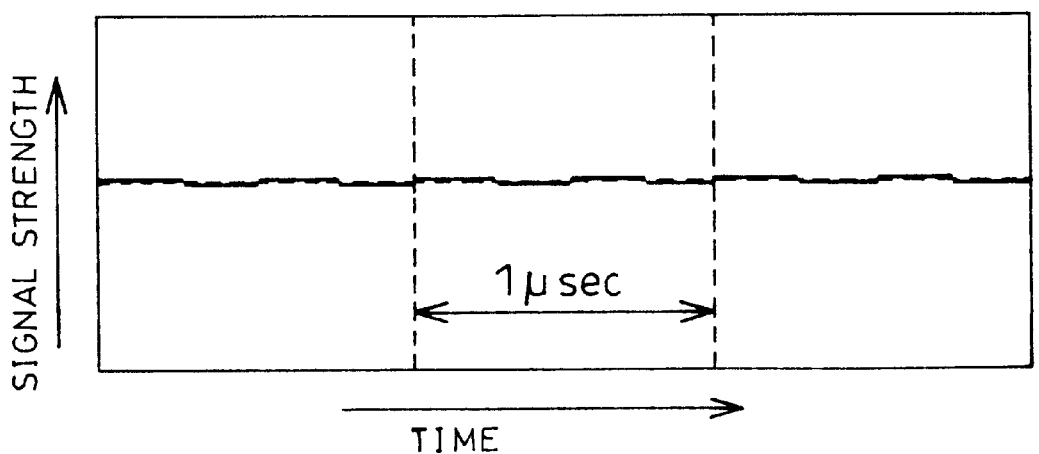

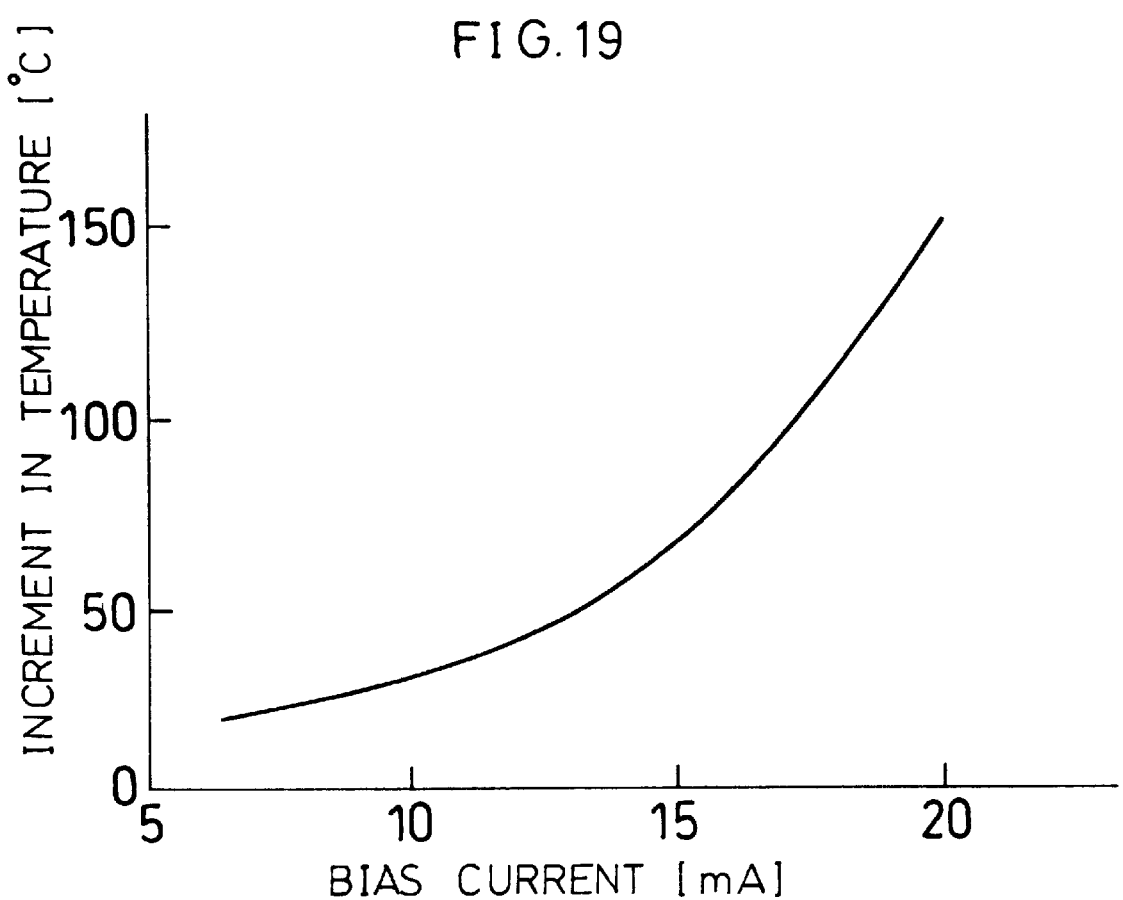

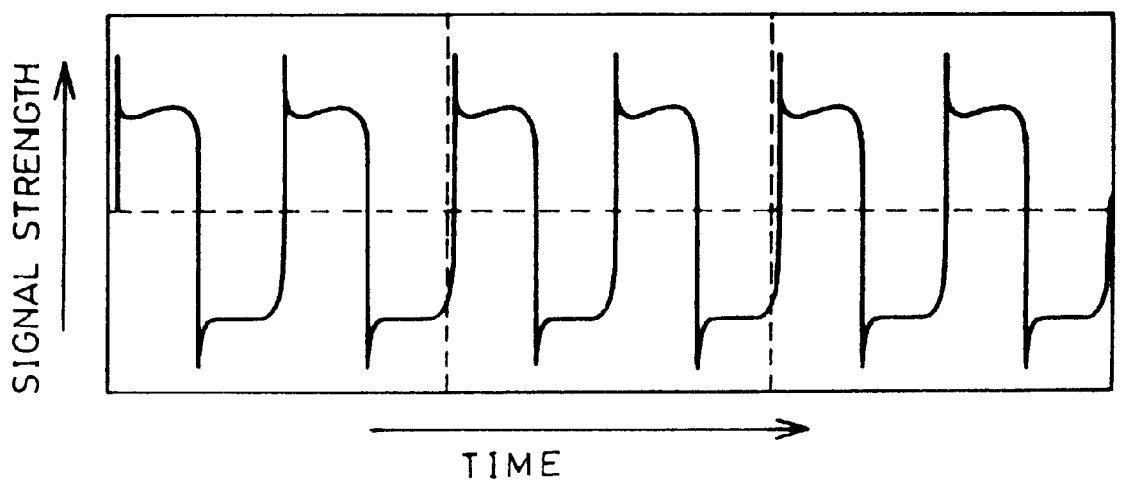
FIG.24(a) LIGHT PROJECTED
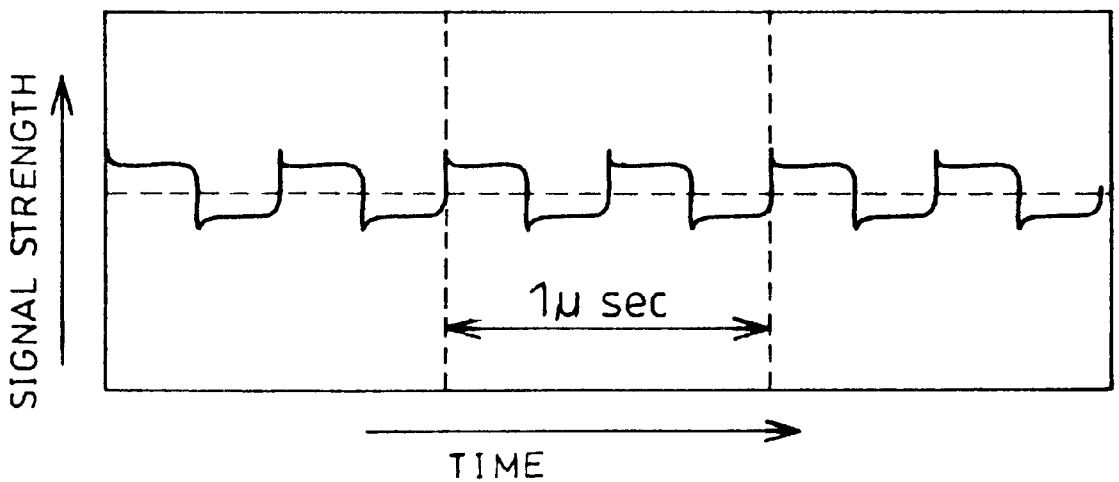
FIG.24(b) NO LIGHT PROJECTED

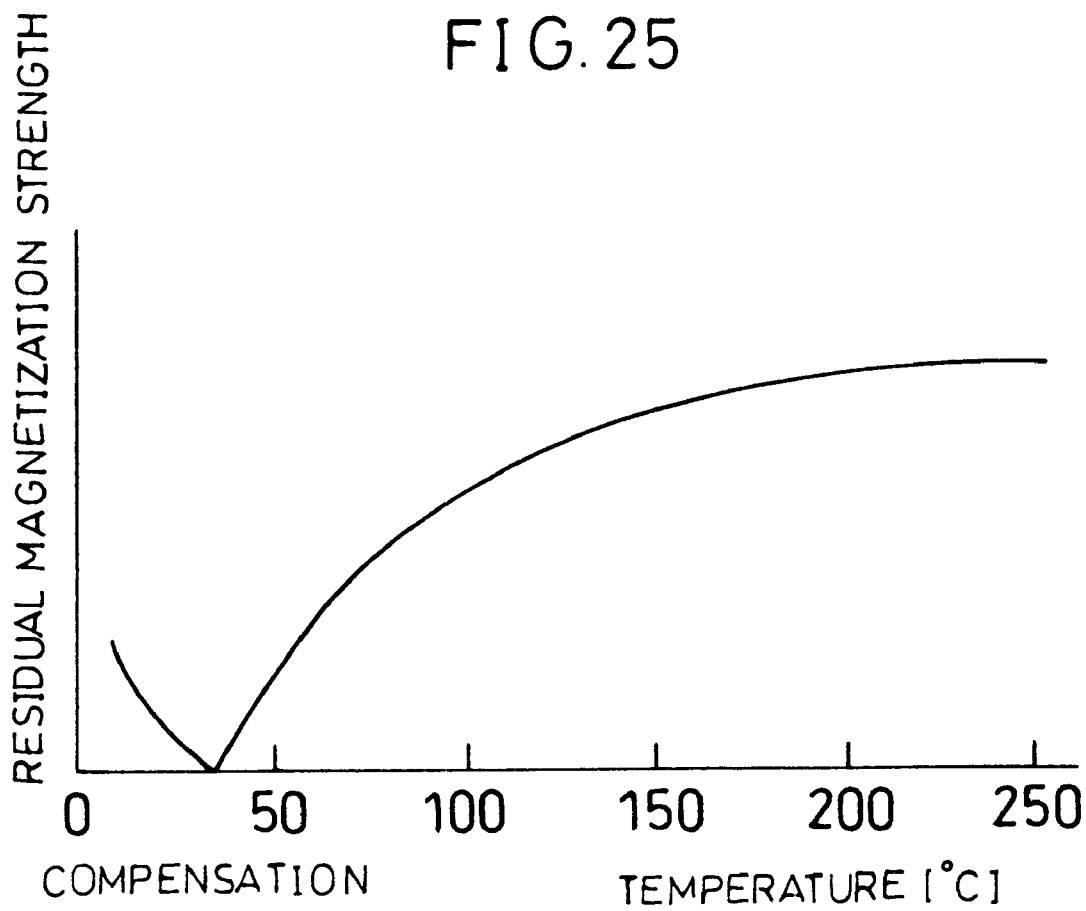

MAGNETIC STORAGE MEDIUM AND HEAT ASSISTED RECORDING AND REPRODUCTION METHOD

FIELD OF THE INVENTION

The present invention relates to magnetic storage media for magnetically recording and reproducing information in a recording domain by heating the domain to a high temperature using a heat source, and also to heat assisted recording and reproduction methods applied to such media.

BACKGROUND OF THE INVENTION

Heat assisted magnetic recording and reproduction schemes have recently been developed to realize high density storage as a fusion of optical technology and magnetic recording and reproduction technology. Japanese Laid-Open Patent Application No. 4-176034/1992 (Tokukaihei 4-176034, corresponding to U.S. Pat. No. 5,656,385 dated Aug. 12, 1997), for example, discloses a magnetic storage medium made of a ferromagnetic material having a compensation temperature set substantially to room temperature, as well as a heat assisted magnetic recording and reproduction scheme using laser light for such a medium.

In the heat assisted magnetic recording and reproduction scheme, information is recorded in a recording domain of a magnetic storage medium by applying an external magnetic field from a recording magnetic head while heating the recording domain to a high temperature using laser light to reduce the coercive force of the recording domain. Meanwhile, according to the scheme, information is reproduced by, again, heating the recording domain to a high temperature with laser light to amplify the strength of residual magnetization in the recording domain, and detecting the magnetic flux generated by the residual magnetization using a reproduction magnetic head.

In the foregoing scheme, the domains where temperature remains at room temperature without being elevated to high temperatures with laser light, have residual magnetization that is ignorably small. Therefore, the crosstalk from adjacent tracks can be restrained to substantially low levels even with a gap width, i.e., a width of the reproduction magnetic head measured perpendicular to the track direction, that is larger than the pitch of the track where information is stored, enabling reproduction of information from a high density storage medium.

Meanwhile, Japanese Laid-Open Patent Application No. 4-95201/1992 (Tokukaihei 4-95201, corresponding to Japanese Patent 2636957, Date of Patent Apr. 25, 1997) discloses a heat assisted magnetic reproduction method whereby signals from adjacent tracks are reduced to restrain crosstalk by heating both sides of the track to be reproduced to high temperatures using a light beam so as to elevate the temperature thereof to a neighborhood of the magnetic compensation temperature at which the residual magnetization is zero.

According to conventionally suggested heat assisted reproduction methods, information is retrieved either by amplifying magnetization by way of heating a reproduction domain or by reducing magnetization to restrain crosstalk by way of heating a neighborhood of a reproduction domain.

Therefore, heat works on only limited areas: either a reproduction track domain or two adjacent tracks of a reproduction track. Either way, information is reproduced using difference in the strength of residual magnetization between domains where temperature is elevated and where temperature is not elevated.

The magnetic compensation temperature of a ferrimagnetic material storage medium is highly susceptible to the composition of the storage medium; a small variation in the composition causes a great change in the magnetic compensation temperature.

For example, an experiment conducted by the inventors of the present invention on a magnetic film of a TbFeCo alloy showed that a fluctuation as small as a few percentage points in the composition ratio of the Tb and the FeCo causes the magnetic compensation temperature to change a few dozen degrees centigrade.

FIG. 26 shows the dependency on the composition ratio, wherein the composition ratio of Tb and FeCo is plotted along the axis of ordinates and the magnetic compensation temperature (referred to as compensation temperature in the figure) is plotted along the axis of abscissas. In this example, a 1% change in the composition ratio caused a 20° C. change in the magnetic compensation temperature.

Consequently, irregularities in the manufacturing process of magnetic storage media constitute an obstacle in the precise setting of the magnetic compensation temperature. Further, considering the actual operational conditions for the recording and reproduction system, since ambient temperature supposedly differs wildly depending on operational environment, the foregoing heat assisted reproduction has trouble in the accurate setting of temperature in the non-elevated temperature domain of the storage medium.

As described in the foregoing, the conventionally suggested heat assisted recording and reproduction has following problems: (1) It is difficult to precisely specify the magnetic compensation temperature of the storage medium and the temperature of the non-elevated temperature domain; (2) Occurrence of crosstalk is inevitable, and (3) Stability in recording and reproduction is low.

SUMMARY OF THE INVENTION

With the foregoing problems taken into consideration, the present invention has an object to offer a heat assisted recording and reproduction method that is stable against, and is hardly affected by, irregularities in the magnetic compensation temperature that occur in the manufacturing process of a magnetic storage medium due to irregularities in the composition, and variations in the temperature of the storage medium caused by ambient temperature at the magnetic storage medium operates.

The present invention has another object to offer a magnetic storage medium used together with a heat source, such as a head employing magneto-resistance effect, as well as to offer a heat assisted recording and reproduction method applied to such a magnetic storage medium, the magnetic storage medium being suited to reproduce information stored in high density with crosstalk occurring due to irregularities in the temperature of the medium only in a restrained manner and hence being capable of producing a good S/N ratio, even if a heat assisted magnetic recording and reproduction method is applied.

To solve the foregoing problems, a magnetic storage medium of the present invention includes a storage layer for use in heat assisted recording and reproduction whereby information is magnetically recorded and reproduced by heating a recording domain, wherein saturated magnetization of the storage layer has a maximum value at a temperature between a magnetic compensation temperature and a Curie point, the temperature being specified in a range from 150° C. to 250° C., and the magnetic compensation temperature of the storage layer is specified higher than room temperature.

In the arrangement, in the magnetic storage medium, the temperature at which the saturated magnetization of the storage layer takes its maximum value between the magnetic compensation temperature and the Curie point is specified in a range from 150° C. to 250° C.; therefore, in the recording domain heated to a neighborhood of the temperature at which the saturated magnetization takes its maximum value, the residual magnetization of the recording domain can be increased, and the information can be reproduced satisfactorily from the recording domain of the storage layer.

Here, for example, even if the head acts as a heat source causing the ambient temperature of the storage layer to exceed room temperature, such as in a case where a head exhibiting a magneto-resistance effect is used for reproduction, since the magnetic compensation temperature of the storage layer can be specified according to the ambient temperature that is higher than room temperature, the temperatures of the recording domains, except that of a recording domain heated for the purpose of reproduction, are equal to the ambient temperature, i.e., equal to the magnetic compensation temperature, and the magnetization is substantially zero. As a result, in the medium, the recording domain to be reproduced is protected from negative effects of magnetization of the other recording domains during reproduction, restraining crosstalk during reproduction.

Further, in the arrangement, by elevating the temperature of the recording domain in the storage layer to a neighborhood of the Curie point, the coercive force of the recording domain can be reduced, and magnetization of the recording domains can be similarly rendered substantially zero except for the aforementioned recording domain, and information can be stably recorded in the recording domain using an external magnetic field that is in accordance with the information.

Further, in the arrangement, the magnetic compensation temperature can be specified to differ from room temperature, for example, higher than room temperature; therefore, when recorded information is to be reproduced, the residual magnetization of the recording domains outside the read-out recording domain (hereinafter, will be simply referred to as the read-out domain) can be minimized by controlling the temperature to which heating means heats the storage layer despite possible occurrence of irregularities in the magnetic compensation temperature. Consequently the arrangement offers an advantage that the S/N ratio of a reproduction signal improves. The heating means may be a head exhibiting magneto-resistance effect which in practice doubles as a heat source.

In the magnetic storage medium, the magnetic compensation temperature of the recording domain may be specified according to a temperature to which the recording layer is heated by the head generating heat based on reproduction of information by magneto-resistance effect.

In the arrangement, even if the storage medium is heated to an elevated temperature by the heat generated by the magneto-resistance effect of the head, since the magnetic compensation temperature is specified higher by at least that elevation in temperature, the residual magnetization can be minimized in the recording domains outside the read-out domain, and a reproduction signal is obtained with a good S/N ratio and restrained crosstalk, which meets the object of the heat assisted reproduction.

To solve the foregoing problems, a heat assisted recording and reproduction method in accordance with the present invention includes the steps of:

preparing a storage medium including as a storage layer a magnetic film exhibiting a magnetic compensation temperature higher than room temperature;

specifying a plurality of heated domains on the storage medium according to the magnetic compensation temperature, the plurality of heated domains each having a different target temperature from the other(s); and recording and/or reproducing information in the storage layer in one of the plurality of heated domains.

As a result, according to the method, the storage medium can be specified to include a plurality of heated domains each having a different target temperature from the other(s) such that a first heated domain in the heated domain is heated to the magnetic compensation temperature and also that a second heated domain, which is not the first heated domain in the heated domain, is heated to a temperature different from the magnetic compensation temperature, for example, higher than the magnetic compensation temperature.

This allows, with the method, the coercive force and the residual magnetization of the storage layer in the second heated domain to be reduced and increased respectively, and therefore enables information to stably be recorded and/or reproduced on the storage layer in the second heated domain.

Also, according to the method, by providing the storage layer of the first heated domain outside the domains where actual recording or reproduction of information takes place and also by heating the storage layer to the magnetic compensation temperature, the residual magnetization can be reduced, for example, to substantially zero; therefore the second heated domain where information is recorded and reproduced is protected from magnetic effects.

Consequently, according to the method, the temperature of the first heated domain can be specified according to the magnetic compensation temperature of the storage layer; therefore generation of unnecessary magnetization by irregularities in the magnetic compensation temperature of the storage layer and variations in ambient temperature can be restrained, allowing information to be reproduced more stably.

According to the method, the temperature of the heated domain when information is recorded and the temperature of the heated domain when information is reproduced may be specified equal to each other, and alternatively, different from each other: for example, the temperature of the heated domain when information is recorded may be specified higher than the temperature of the heated domain when information is reproduced. If the temperatures are specified equal to each other, heat control can be facilitated. In contrast, if the temperature of the heated domain when information is recorded is specified higher than the temperature of the heated domain when information is reproduced, the heated domain in recording has a reduced coercive force and thus allows a weaker external magnetic field to perform recording, facilitating the recording process.

Another heat assisted recording and reproduction method in accordance with the present invention is such that when information recorded in the recording domain of the magnetic storage medium is reproduced using a head exhibiting magneto-resistance effect, the bias current applied to the head is altered according to the temperature of the recording domain.

According to the method, when recorded information is reproduced from the magnetic storage medium using a head exhibiting magneto-resistance effect, heat generation by the head can be controlled by adjusting the bias current applied to the head according to the temperature of the recording domain, thereby causing the temperature of the recording domains, except for the recording domain to be reproduced, in a neighborhood of the head to be rendered closer to the magnetic compensation temperature of the recording domain.

Consequently, according to the method, even if there occurs a deviation in the magnetic compensation temperature due to irregularities in composition of the storage domain or a variation in the heating amount due to a change in the linear velocity of the head, the residual magnetization can be minimized in the recording domains outside the recording domain to be reproduced, and crosstalk is restrained; therefore, the S/N ratio in the reproduction signal can be maintained at a satisfactory level.

For a fuller understanding of the nature and advantages of the invention, reference should be made to the ensuing detailed description taken in conjunction with the accompanying drawings.

BRIEF DESCRIPTION OF THE DRAWINGS

FIG. 18(a) and FIG. 18(b) are graphs showing results of reproduction of information on the foregoing magnetic storage medium by a heat assisted recording and reproduction scheme using a light beam, FIG. 18(a) showing those results when light is projected, and FIG. 18(b) showing those results when no light is projected.

FIG. 19 is a graph showing a relationship between bias currents and heat generation in an MR head for use with the heat assisted recording and reproduction method.

FIG. 24(a) and FIG. 24(b) are graphs showing results of reproduction of information on a conventionally suggested magnetic storage medium by a heat assisted scheme for the purpose of illustrating advantages of the invention as set forth in the fifth to tenth embodiments in accordance with the present invention, FIG. 24(a) showing those results when light is projected, and FIG. 24 (b) showing those results when no light is projected.

FIG. 25 is a graph showing temperature-dependent characteristics of the residual magnetization strength of the foregoing conventional magnetic storage medium.

DESCRIPTION OF THE EMBODIMENTS

Embodiment 1

Referring to FIG. 1 through FIG. 15, the following description will explain magnetic storage media and heat assisted recording and reproduction methods as set forth in embodiments in accordance with the present invention. The magnetic storage medium (storage medium) of the present invention has, on a transparent support substrate made of glass and possibly other materials, a magnetic film that is made of a ferrimagnetic material, such as a rare earth transition metal, to act as a storage layer (the thickness of the storage layer is, for example, 100 nm).

The magnetic compensation temperature of the storage layer of the magnetic storage medium is specified out of a room temperature range of 20° C. to 25° C., but preferably, within an ambient temperature range in which the medium is used. Accordingly, the magnetic compensation temperature is specified in a range of, for example, from 40° C. to 100° C., more preferably from 43° C. to 80° C., and even more preferably from 46° C. to 60° C.

The storage layer of the magnetic storage medium exhibits a maximal residual magnetization strength (saturated magnetization) at a temperature between the magnetic compensation temperature and the Curie point; the maximal value of the temperature is specified in a range of from 150° C. and 250° C., preferably from 160° C. to 240° C., and more preferably from 170° C. to 230° C.

The Curie point of the storage layer of the magnetic storage medium is specified in a range of from 200° C. to 400° C., preferably from 240° C. to 360° C., more preferably from 280° C. to 320° C.

The ferrimagnetic storage media used in the err: embodiments are all identical. The storage media commonly exhibit temperature-dependent characteristics represented by the residual magnetization 100 and the coercive force 101 in FIG. 2 for example, and include a magnetic film made of an alloy of three metals, namely, Tb, Fe, and Co for example, as a storage layer.

It is popularly known that in a magnetic film made of such an alloy, the magnetic compensation temperature changes with the Tb content. The composition of the magnetic film fabricated here is, for example, $Tb_{26}Fe_{44}Co_{30}$ (the numerals denote respective atoms in percentage points). In a magnetic film having this composition, the magnetic compensation temperature is 50° C., the Curie point is 290° C., and the residual magnetization takes its maximum value at a temperature of 150° C. As understood from FIG. 2, the storage medium is specified to exhibit a magnetic compensation temperature higher than room temperature and needs to be heated from room temperature to the magnetic compensation temperature to reduce the residual magnetization to substantially zero.

Figure 3:
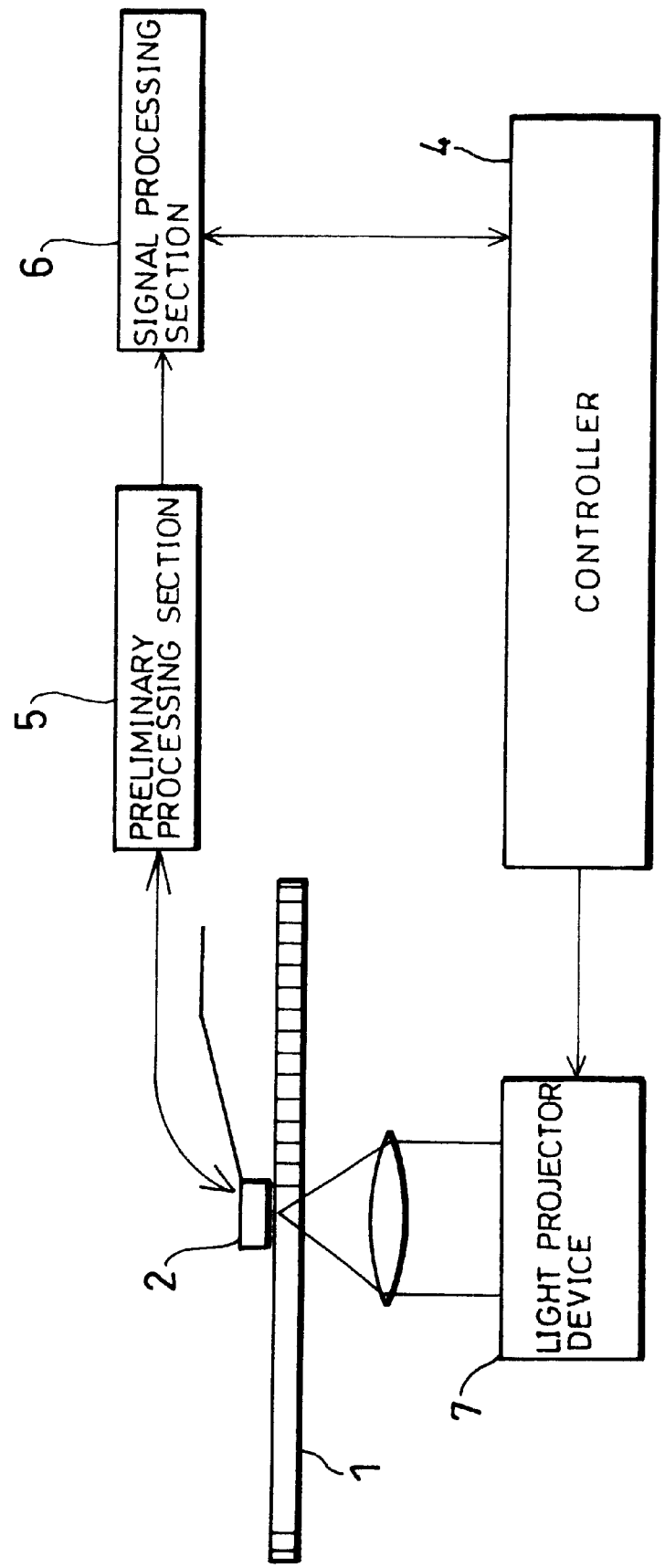
FIG. 3 is an arrangement drawing showing a recording and reproduction device of the first and second embodiments in accordance with the heat assisted recording and reproduction method.
Figure 4:
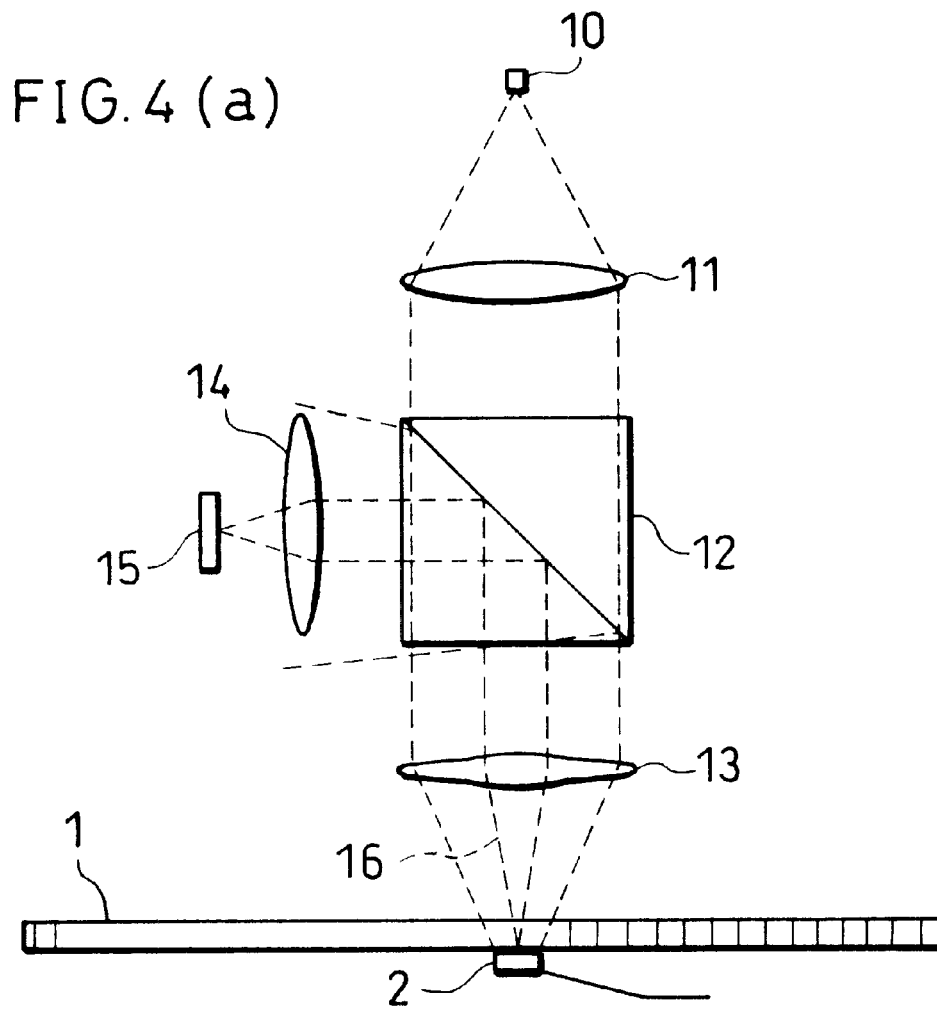
FIGS. 4(a) through 4(c) are explanatory drawings showing a light projector device of the first embodiment, FIG. 4(a) being a detailed arrangement drawing, FIG. 4(b) being an explanatory drawing showing first and second heated domains, and FIG. 4(c) being an explanatory drawing showing the temperature profile of the first and second heated domains.
Figure 4:
Figure 4:
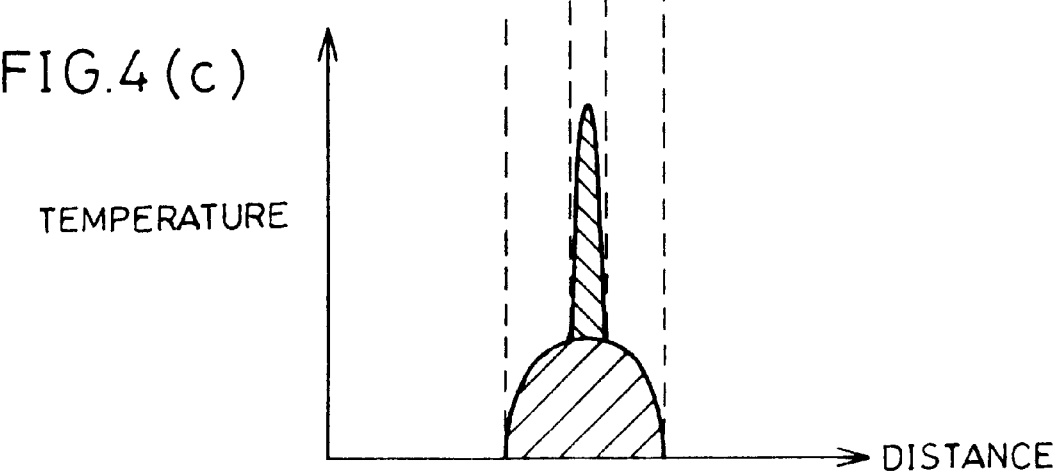

Now, a heat assisted recording and reproduction method will be discussed. FIG. 3 shows, as an example, an arrangement of a magnetic recording and reproduction device for use with a heat assisted recording and reproduction method.

First, recording operation will be discussed in accordance with the heat assisted recording and reproduction method. The information to be recorded is transmitted as a recording signal from an external device (not shown) to a signal processing section 6 where the recording signal is modulated by encoding based on a command from a controller 4 to suit magnetic recording. Subsequently, the modulated signal is converted to a current signal by a preliminary processing section 5 and then drives a recording coil in a recording magnetic head to generate a recording magnetic field.

Figure 2:
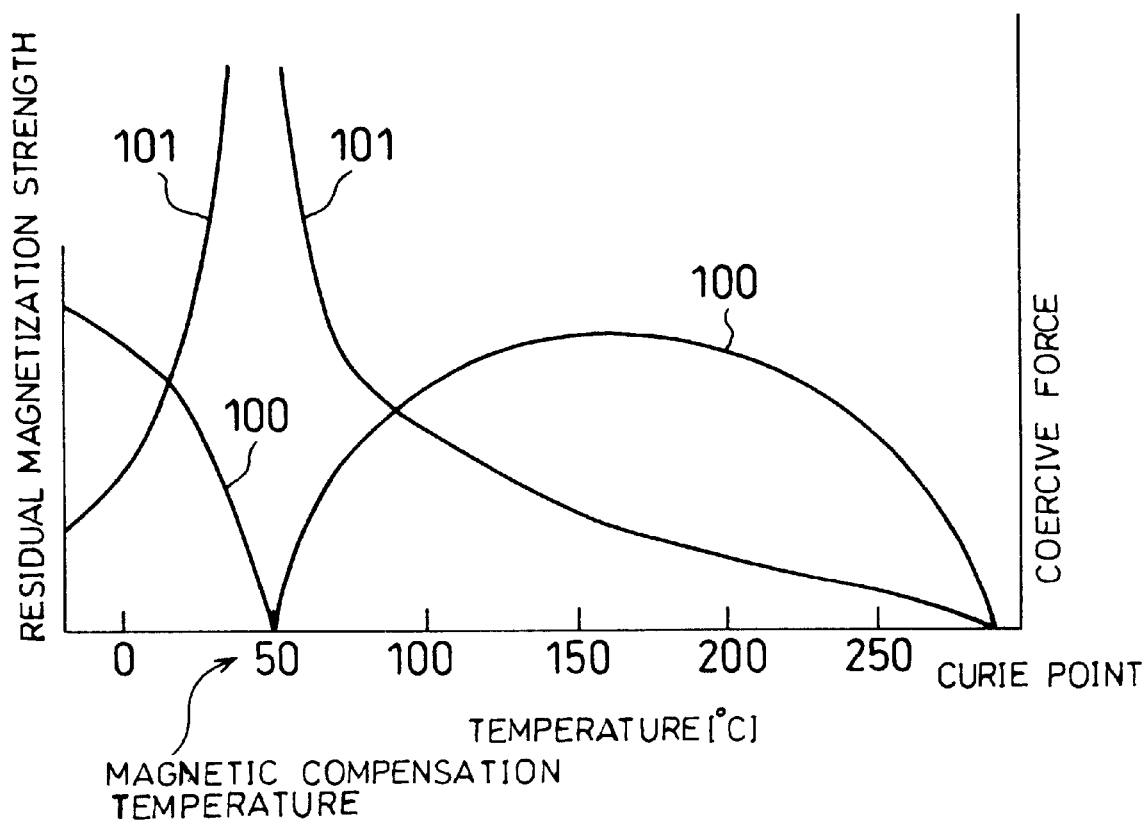
FIG. 2 is a graph showing temperature-dependent characteristics of the residual magnetization strength and the coercive force of the magnetic storage media used in the first to fourth embodiments in accordance with the heat assisted recording and reproduction method.

Meanwhile, the controller 4 gives a command causing a light projector device 7 to project recording light. The light projector device 7 is disposed opposite to the recording magnetic head across the storage medium. Hence, the recording magnetic field and the light power are supplied to the magnetic storage medium 1; temperature is elevated to produce a recording-use elevated temperature domain as a second heated domain (not lower than 200° C. and not higher than the Curie point), as shown in FIG. 2, where the coercive force substantially diminishes, and recording magnetic fields are stored in a stable manner in the storage layer according to the information.

Now, reproduction operation will be discussed in accordance with the heat assisted recording and reproduction method. First, the controller 4 gives a command causing the light projector device 7 to project light on a read-out (reproduction) domain to heat the magnetic storage medium 1. This causes the magnetic storage medium 1 to be in a state where the residual magnetization is maximum in a reproduction-use elevated temperature domain as a second heated domain (a neighborhood of 150° C. where the residual magnetization is maximal), as shown in FIG. 2.

The residual magnetization is detected by a reproduction-use magnetic head 2. The detected signal is amplified by the preliminary processing section 5 and transmitted to the signal processing section 6. In the signal processing section 6, the reproduction signal is binarized, demodulated, checked and corrected for error, to recover the original information. Exemplary reproduction-use magnetic heads 2 include a coil-including magnetic head, an MR (Magnet-Resistive) head using magneto-resistance effect, and GMR (Giant Magnet-Resistive) head that boasts an even higher magnetic field sensitivity.

Now, referring to FIG. 1 through FIG. 8, the following description will discuss in detail the first embodiment in accordance with the heat assisted recording and reproduction method, specifically, a method of forming second heated domains where recording and reproduction actually takes place and first heated domains surrounding the second heated domains.

As shown in FIG. 4(a) and FIG. 4(b), the light projector device 7 of the first embodiment projects a laser 10, which is a heat source. The laser 10 passes through a dual-focal-point objective lens 13 and forms two concentric circular heated domains, i.e., a first heated domain 18 and a second heated domain 19, on the magnetic storage medium 1 simultaneously. The second heated domain 19 is therefore formed encircled by the first heated domain 18.

Specifically, light projected by the laser 10 is collimated by a collimate lens 11, and directed to a beam splitter 12. About a half of the incident light passes through the beam splitter 12 and directed to the dual-focal-point objective lens 13.

The dual-focal-point objective lens 13 is designed to have a short focal length in the central portion, and a longer focal length near the circumference than in the central portion. For example, when a light flux 16 passing through the central portion is to be controlled to focus on the magnetic storage medium 1, the light flux 16 passing through the central portion is reflected at the storage layer of the magnetic storage medium 1. The reflected light passes through the dual-focal-point objective lens 13, and about a half of the light is reflected and directed by the beam splitter 12 to an optical detecting system 14.

The optical detecting system 14 converges the light flux 16 passing through the central portion of the dual-focal-point objective lens 13 to focus on a detector 15. Meanwhile, the light flux 16 near the circumference of the dual-focal-point objective lens 13 does not focus on the magnetic storage medium 1, and therefore is not converged to focus on the detector 15. Consequently, according to the information obtained from the light flux 16 passing through the central portion by the detector 15, the dual-focal-point objective lens 13 is driven so as to control the light flux 16 to always focus on the magnetic storage medium 1.

The light flux 16 passing through the dual-focal-point objective lens 13 near circumference thereof is always out of focus on the magnetic storage medium 1. Consequently, the spot size (area) of the first heated domain 18 is larger than that of the second heated domain 19, and for example, has a spot diameter of about 6 $\mu$m.

From the foregoing, on the magnetic storage medium 1, there are two spots being formed: a focus point spot (the spot diameter is about 1 $\mu$m) is formed by the light flux 16, and a non-focus point spot (the spot diameter is about 6 $\mu$m) is formed by the light flux 16 passing near the circumference. The first and second heated domains 18 and 19, in other words, the first heated domain 18 and the second heated domain 19 positioned (formed) inside the first heated domain 18, are simultaneously created by a single laser 10.

Since the first and second heated domains 18 and 19 are heated to high temperatures in direct proportion to the light energy intensity received by the domains, the domains assume a heat distribution profile where the second heated domain 19 is hotter than the first heated domain 18 similarly to the one shown in FIG. 4(c). The relative target temperature difference between the first heated domain 18 in the non-focus point spot and the second heated domain 19 in the focused spot is determined solely by the design of the dual-focal-point objective lens 13, and does not depend upon any other factors.

For example, to realize a magnetic compensation temperature of about 50° C. and a maximum residual magnetization strength at a temperature of about 150° C. as shown in FIG. 2, the target temperature difference between the first heated domain 18 and the second heated domain 19 in the focus point spot should be set to 100° C. For this purpose, the dual-focal-point objective lens 13 needs to be designed so as to form a first heated domain 18 where temperature is in a neighborhood of the magnetic compensation temperature, and a second heated domain 19 where temperature is in a neighborhood of temperature at which the residual magnetization is maximum. Design parameters of the lens 13 are the focal length and the number of apertures (NA) of the lens.

In the present embodiment, a single laser 10, i.e., a single heat source, simultaneously generates two kinds of heated domains, i.e., the heated domains 18 and 19; therefore the target temperatures for the heated domains 18 and 19 are varied with light projection power of the laser 10.

Hence, the target temperature difference between the two kinds of heated domains, i.e., the heated domains 18 and 19, required in the magnetic storage medium 1 does not alter. Therefore, modifications can be quickly and readily made to allow for changes in operational ambient temperature caused by ambient temperature, etc.

The target temperature is specified in the following manner. As shown in FIG. 3, the magnetization direction representing information stored in the magnetic storage medium 1 is detected as a reproduction signal by the reproduction-use magnetic head 2. The detected reproduction signal is amplified by the preliminary processing section 5 and supplied to the controller 4 via the signal processing section 6. The controller 4 is capable of performing evaluation on the quality of a reproduction signal.

Therefore, while evaluating the quality of a reproduction signal, the controller 4 can control the light projection power of the laser 10 in the light projector device 7. The reproduction-use magnetic head 2 is specified, for example, to 0.3 $\mu$m in gap length and 5 $\mu$m in gap width, that is, length measured perpendicular to the recording track. The domain on the magnetic storage medium 1, that is detectable with the present reproduction-use magnetic head 2, is roughly of the same dimensions.

Therefore, the first heated domain, which is of a circular shape having a diameter of about 6 $\mu$m, is large enough to cover this detectable domain. In other words, if the light projection power is optimized, the reproduction-use magnetic head 2 detects only the leakage magnetic field caused by the magnetization amplified by the second heated domain 19.

Further, during recording, the domain (first heated domain 18) surrounding a recording domain (second heated domain 19) does not magnetically affect the recording domain, for the surrounding domain has substantially no magnetization. In the present embodiment, however, the target temperatures of the second heated domain 19 during reproduction and during recording are set to the same value due to the arrangement of the light projector device 7. That is, the reproduction light power is equal to the recording light power.

Figure 1:
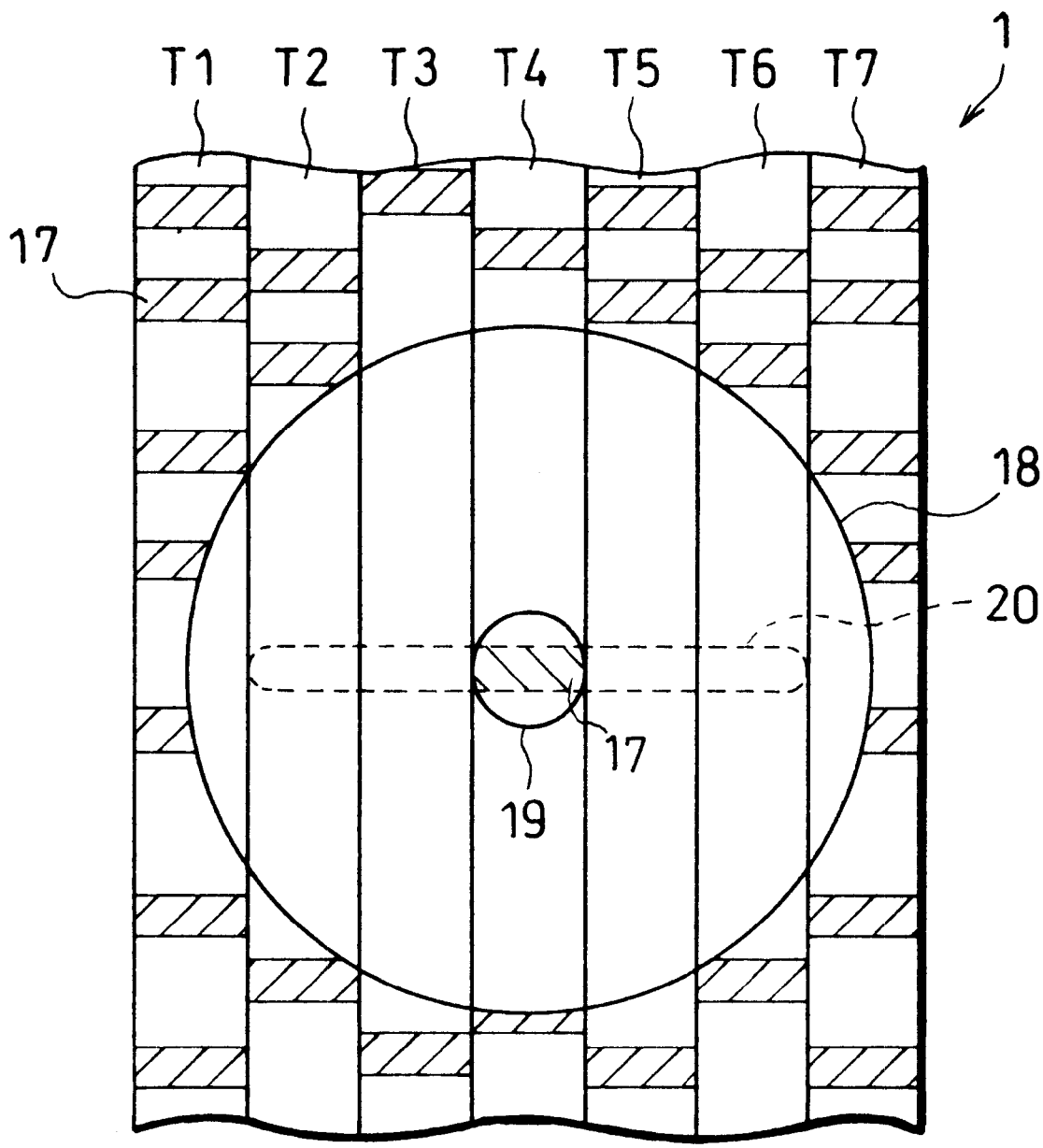
FIG. 1 is an explanatory drawing showing a detecting section of a reproduction-use magnetic head, a recording track, and a recording bit in terms of their relative size for use with a heat assisted recording and reproduction method in accordance with the present invention.

FIG. 1 shows the relationship between spots in terms of size. T1 to T7 denotes exemplary recording tracks on the magnetic storage medium 1. FIG. 1 shows reproduction of a recording bit 17 stored on a recording track T4. The second heated domain 19 has substantially the same width as the track. Meanwhile, the first heated domain 18, spanning over the recording tracks T1 to T7, has a greater width than the track.

In the first heated domain 18, the temperature of the magnetic storage medium 1 is maintained at the magnetic compensation temperature; therefore those recording bits 17 located inside the first heated domain 18 but outside the second heated domain 19 have substantially no magnetization, and are not detectable with the reproduction-use magnetic head 2.

In the second heated domain 19, the residual magnetization of the recording bit 17 is amplified, and the leakage magnetic field originating at the recording bit 17 is detectable with the reproduction-use magnetic head 2 as information stored. The length of a detecting section 20 of the reproduction-use magnetic head 2 measured along the track width is smaller than the length of the first heated domain 18 measured along the track width; as a result, the reproduction-use magnetic head 2 detects only the recording bits 17 in the recording track T4.

Now, a method of evaluating quality of a reproduction signal will be discussed. Quality of a reproduction signal can be evaluated by way of, for example, determining light projection power by taking an amount of crosstalk from adjacent tracks into consideration. In such an event, the amount of crosstalk per se is difficult to evaluate, and is preferably evaluated by way of an index reflecting the amount of crosstalk.

Figure 5:
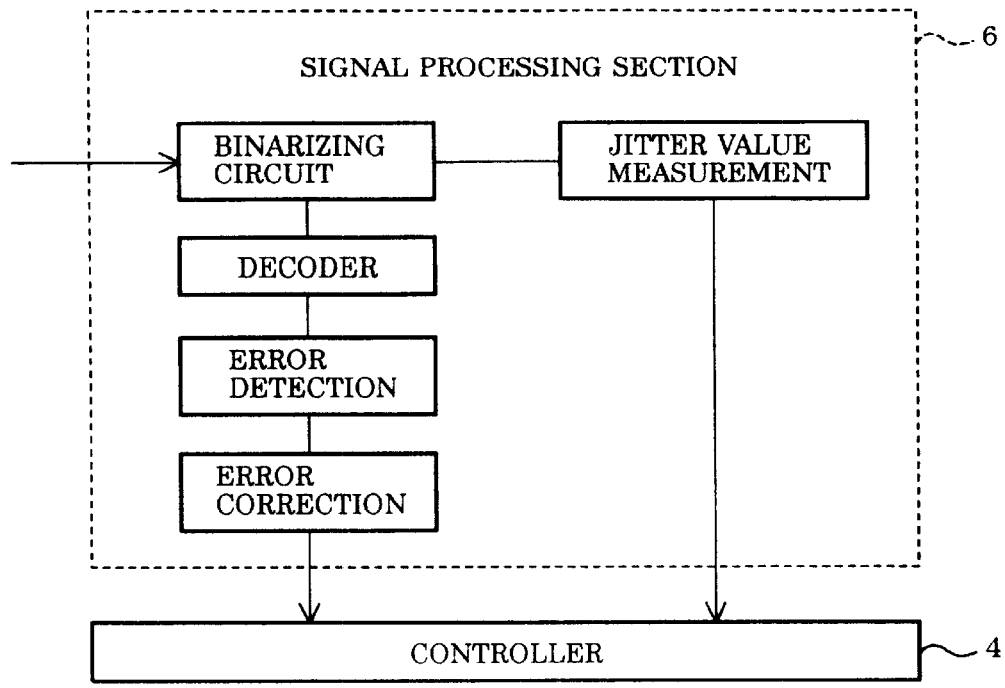
FIG. 5 is an arrangement drawing showing a signal processing section for use with a method of specifying a target temperature for the first heated domain by evaluating the jitter value of a reproduction signal in accordance with the heat assisted recording and reproduction method.

FIG. 5 shows an arrangement of the signal processing section 6 when using the jitter value of the digital signal obtained from binarization of a reproduction signal. The resultant jitter value is supplied to the controller 4 and serves also as judgement information for the controller 4 to specify the light projection power generated by the light projector device 7.

Figure 6:
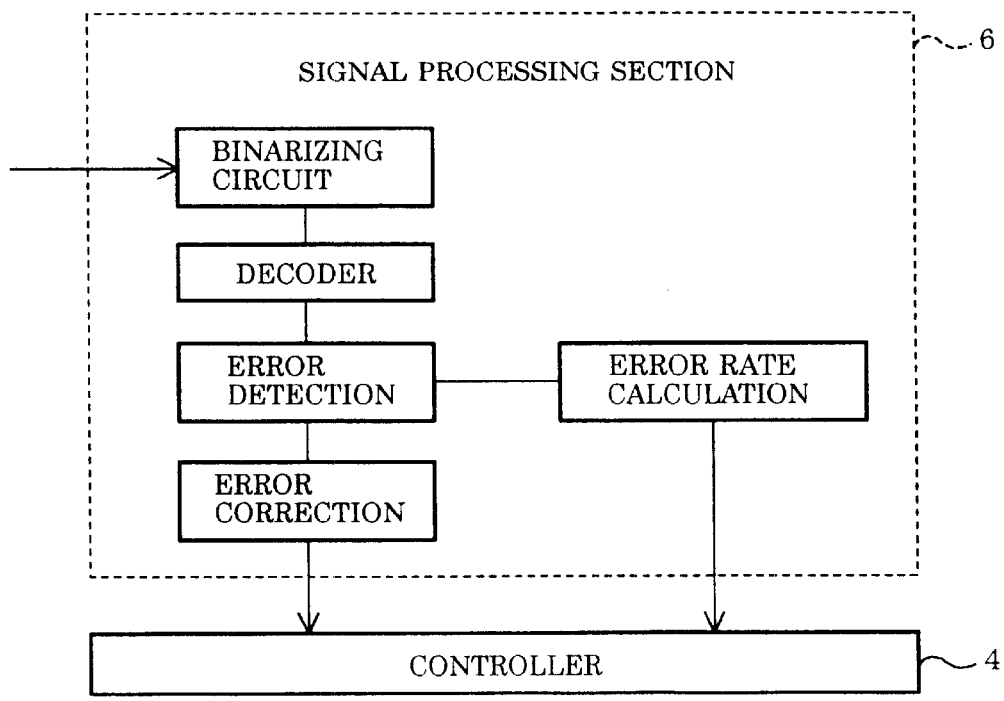
FIG. 6 is an arrangement drawing showing a signal processing section for use with a method of specifying a target temperature for the first heated domain by evaluating the error rate of a reproduction signal in accordance with the heat assisted recording and reproduction method.

FIG. 6 shows an arrangement of the signal processing section 6 when using the error rate obtained from decoding of binarized, digital information. The error rate is calculated by counting the number of errors detected during the decoding step for a certain period of time.

The resultant error rate is supplied to the controller 4, and serves also as judgement information for the controller 4 to specify the light projection power generated by the light projector device 7. Accordingly, the signal processing section 6 calculates either or both of the jitter value and the error rate, and the controller 4 then specifies the light projection power so as to minimize the value(s) thereof. In the first heated domain 18 formed by the light projection power thus specified, the magnetic storage medium 1 has substantially no residual magnetization.

Figure 7:
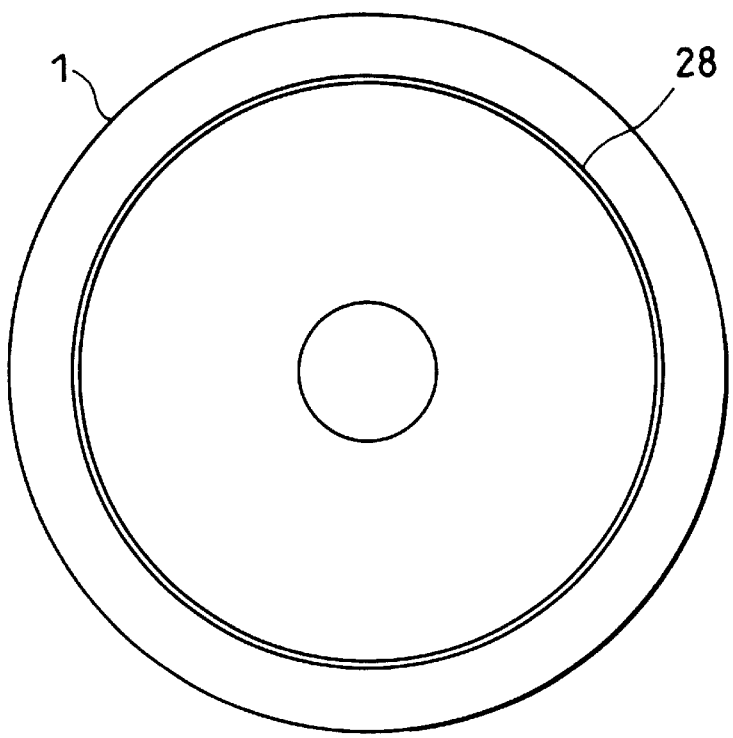
FIG. 7 is an explanatory drawing showing a magnetic storage medium having an evaluation domain in which a reproduction signal is specified in advance for evaluation to specify a target temperature for the first heated domain in accordance with the heat assisted recording and reproduction method.

Besides, the evaluation of reproduction signal quality is preferably performed using a predetermined domain on the magnetic storage medium 1. In FIG. 7, there is provided an evaluation domain 28 on a part of the magnetic storage medium 1. The evaluation domain 28 extends along a scanning direction, for example, parallel to the circumference, of the magnetic storage medium 1. To specify the light projection power, an access is first made to the evaluation domain 28 to evaluate the reproduction signal quality by reproducing a pre-fixed information pattern stored in the evaluation domain 28.

Light projection power is specified based on results of the evaluation. Here, the use of a fixed information pattern allows reproduction to be evaluated readily and quickly, adding to the reliability of light projection power specification.

Figure 8:
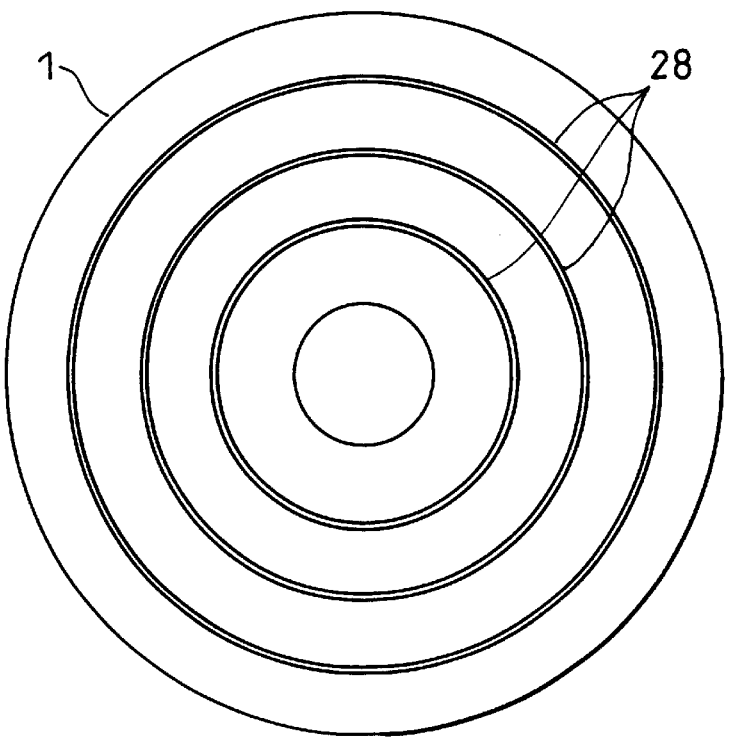
FIG. 8 is an explanatory drawing showing a magnetic storage medium having a plurality of evaluation domains.

FIG. 8 shows, as an example, a plurality of evaluation domains 28 provided on the magnetic storage medium 1. Typically, the magnetic storage medium 1 is controlled so as to rotate at a constant angular velocity to satisfy demand for accessibility. Therefore, the linear velocity varies depending on whether the magnetic storage medium 1 is being reproduced in the central portion or near the circumference thereof. The linear velocity is relatively low when the medium 1 is reproduced near the central portion thereof, and increases as the reproduction of the magnetic storage medium 1 progresses toward the circumference. This means that if the light projection power is constant, the light power projected to the magnetic storage medium 1 per unit area is not constant.

Therefore, information is reproduced and recorded at high reliability over the entire magnetic storage medium 1, by scattering the plurality of evaluation domains 28 on the entire surface of the magnetic storage medium 1 as shown in FIG. 8, and specifying the light projection power according to evaluation of reproduction signal quality using an evaluation domain 28 closely located to a domain actually reproduced. The provision of evaluation domains 28 in plurality has another advantage of shorter access time.

The plurality of evaluation domains 28 may be provided along a single radius of the magnetic storage medium 1 so that adjacent ones are spaced an identical interval apart. When the magnetic storage medium 1 is divided into zones each of which includes a plurality of tracks, an evaluation domain 28 is preferably provided in each zone.

The foregoing evaluation of reproduction is preferably performed during standby for recording or reproduction of information. The foregoing evaluation of reproduction, if performed during standby, can be prevented from affecting actual recording and reproduction operation, successfully avoiding degradation of recording and reproduction capabilities of a recording and reproduction device for use with a heat assisted recording and reproduction method.

Embodiment 2

Figure 9A:
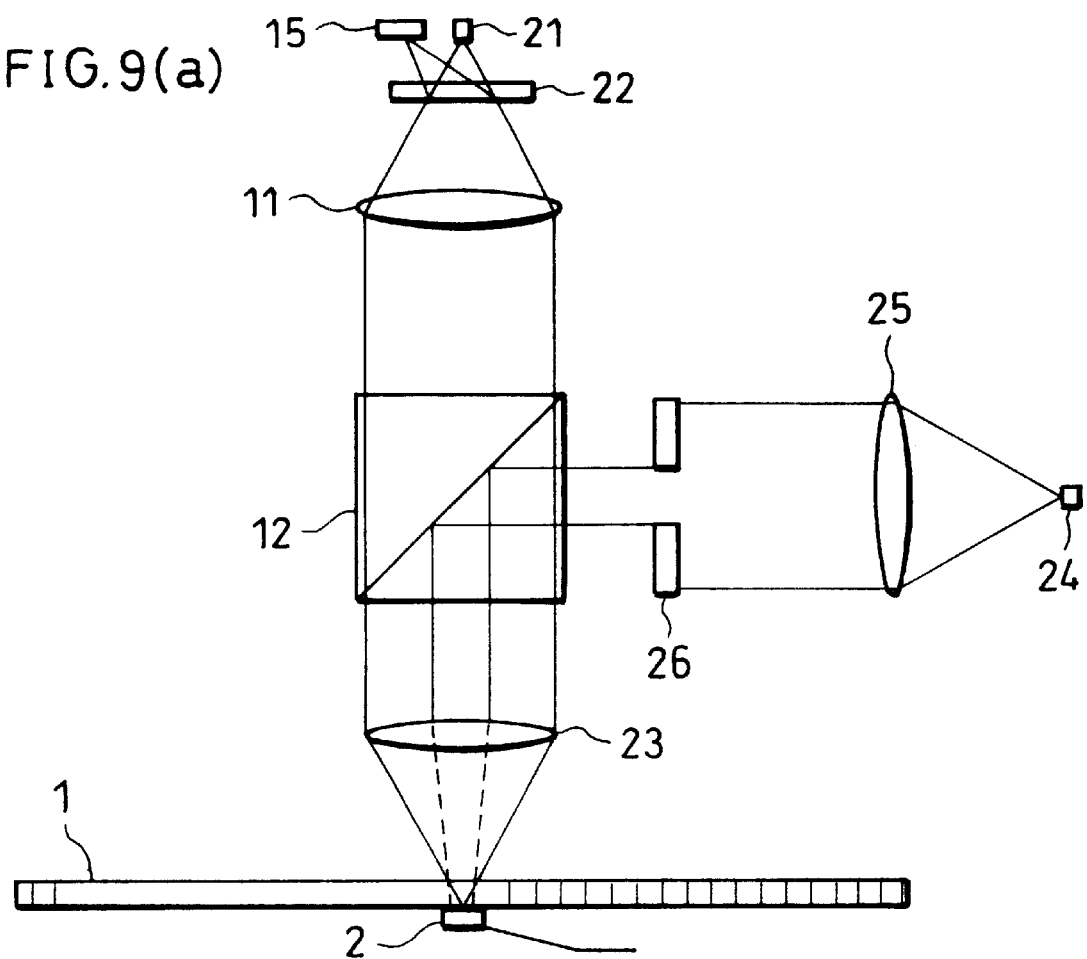
FIGS. 9(a) through 9(c) are explanatory drawings showing a light projector device of the second embodiment in accordance with the present invention, FIG. 9(a) being a detailed arrangement drawing, FIG. 9(b) being an explanatory drawing for first and second heated domains, and FIG. 9(c) being an explanatory drawing showing the temperature profile of the first and second heated domains.
Figure 9B:
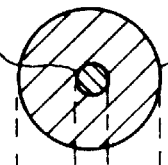
Figure 9C:
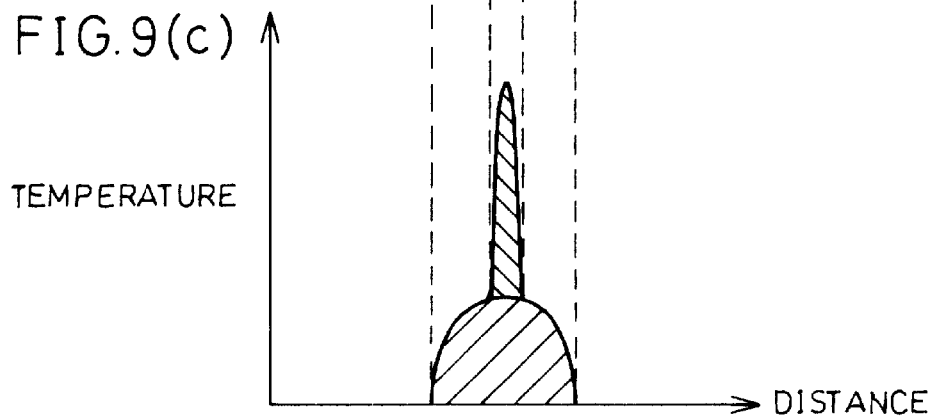

Referring to FIG. 2 and FIG. 9, the following description will discuss a second embodiment of the present invention. FIG. 9 shows in detail a light projector device 7 of the present embodiment. Here, two light sources, a laser 21 and a laser 24, are used to form two kinds of heated domains 18 and 19 similarly to the foregoing embodiment.

In the light projector device 7, light projected by the laser 21 passes through a hologram 22, is collimated by a collimate lens 11, and passes through a beam splitter 12, and is converged by an objective lens 23 on a storage layer of the magnetic storage medium 1.

The light reflected at the storage layer of the magnetic storage medium 1 passes through the objective lens 23, the beam splitter 12, the collimate lens 11, and the hologram 22 and is converged to focus on the detector 15. An output of the detector 15 is used to servo control the objective lens 23.

Meanwhile, the light projected by the laser 24 is collimated by a collimate lens 25, and partly blocked by a n aperture 26. The light flux passing through the aperture 26 is reflected by the beam splitter 12 to travel toward the objective lens 23, and converged on the storage layer of the magnetic storage medium 1 by the objective lens 23.

The light flux projected by the laser 24 is partly blocked by the aperture 26 as discussed above, and therefore excites only part of the objective lens 23. Consequently, the beam spot formed by the convergence of the light flux projected by the laser 24 is larger than the spot formed by the convergence with diffraction limit; the more part of the light flux is blocked, the larger the spot.

Therefore, the first heated domain 18 is generated from the light project ed by the laser 24, while the second heated domain 19 is generated from the light projected by the laser 21 and blocked to diffraction limit. The area of the first heated domain 18 is determined by how much of the light flux is blocked by the aperture 26.

Further, since in the present light projector device 7, the two lasers 21 and 24 are used to create the respective heated domains 18 and 19, the target temperatures in the heated domains 18 and 19 can be altered individually with the light projection powers of the lasers 21 and 24.

The configuration allows optimal target temperatures to be specified even when the target temperature difference of the two kinds of heated domains 18 and 19 as required by the magnetic storage medium 1 alters from one magnetic storage medium 1 to another.

Specifically, the target temperature of the first heated domain 18 can be caused closer to the magnetic compensation temperature according to the magnetic storage medium 1. Besides, the target temperatures of the second heated domain 19 during recording and reproduction can be specified separately from the target temperature of the first heated domain 18 and from each other. To specify the target temperatures, the light projection powers of the two lasers 21 and 24 are controlled individually.

As previously discussed in the first embodiment in reference to FIG. 2, the reproduction signal detected by the reproduction-use magnetic head 2 is amplified by the preliminary processing section 5 and supplied to the controller 4 via the signal processing section 6, allowing the controller 4 to evaluate reproduction signal quality.

Therefore, the controller 4 can control the individual light projection powers of the lasers 21 and 24 provided in the light projector device 7 while evaluating reproduction signal quality. Specifically, the procedures below are followed to evaluate reproduction signal quality.

First, the light projection power of the laser 21 is fixed with the light projection power of the laser 24 being varied, so as to determine an optimal light projection power of the laser 24. The second heated domain 19 created by this light projection power has substantially no residual magnetization.

Thereafter, the light projection power of the laser 24 is fixed with the light projection power of the laser 21 being varied to evaluate reproduction signal quality and determine an optimal reproduction light projection power of the laser 21. Meanwhile, recording is executed with the light projection power of the laser 24 being fixed to a value equal to that used for reproduction and the light projection power of the laser 21 being varied, and the recorded data is reproduced with an optimal reproduction light projection power of the laser 21 to evaluate the recording and determine an optimal recording light projection power.

The foregoing evaluation of reproduction signal quality is performed in the same manner and at the same timing as that in the first embodiment; description thereof is therefore omitted in the present embodiment.

Embodiment 3

Figure 10:
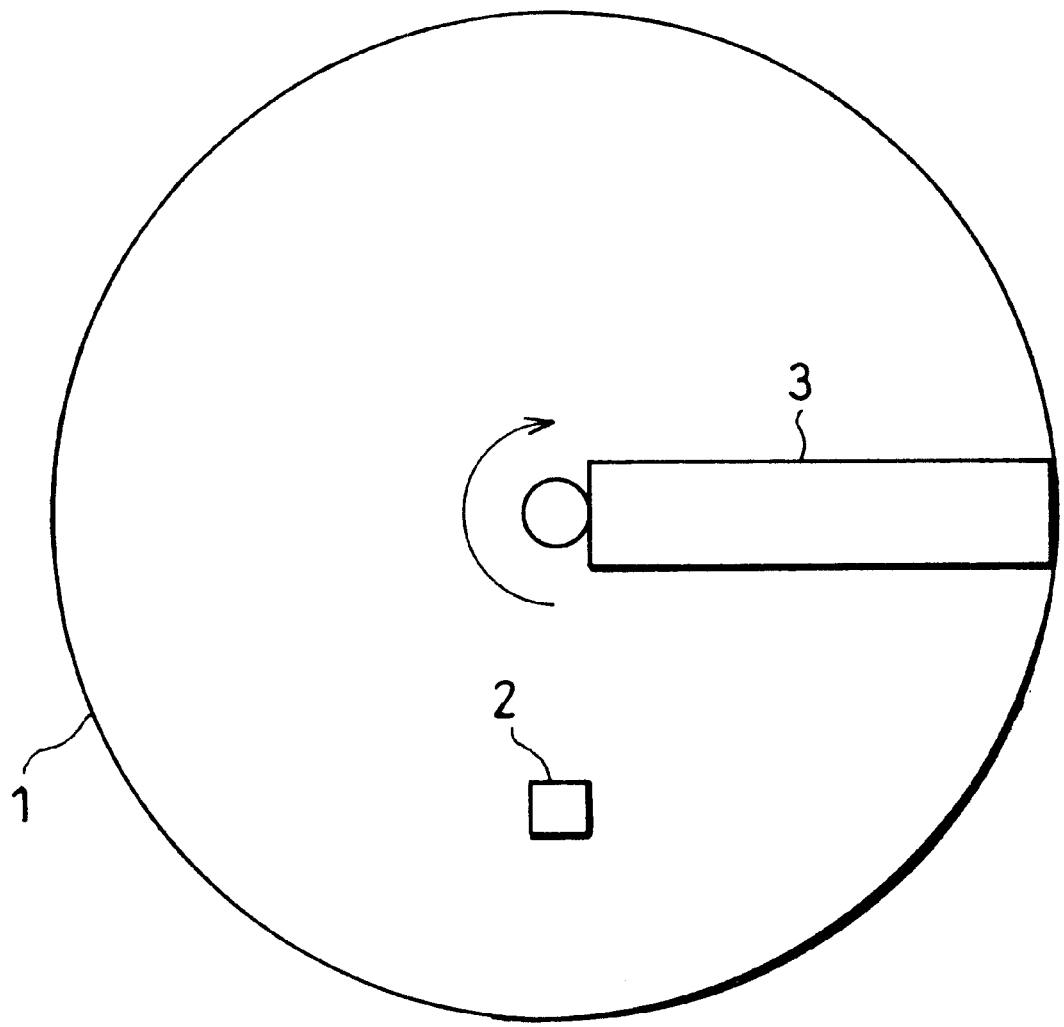
FIG. 10 is an explanatory drawing showing relative positions of a heat generator, a magnetic storage medium, and a magnetic head of the third embodiment in accordance with the present invention.

Referring to FIG. 10 to FIG. 13, the following description will discuss the third embodiment of the present invention. In the present embodiment, Joule heat generated by a heat generator 3 is used to form the first heated domain 18 as shown in FIG. 10. Specifically, the heat generator 3 is fixed by a supporting body (not shown) at a different place from the reproduction-use magnetic head 2 with respect to a circular direction and heats the magnetic storage medium 1 in a non-contact manner.

The magnetic storage medium 1 is heated right beneath the heat generator 3, but the heated part has cooled down when coming under the reproduction-use magnetic head 2 as the magnetic storage medium 1 rotates. Therefore, the heating temperature of the heat generator 3 is controlled such that the cooled down temperature approximates the magnetic compensation temperature of the magnetic storage medium 1.

Figure 11:
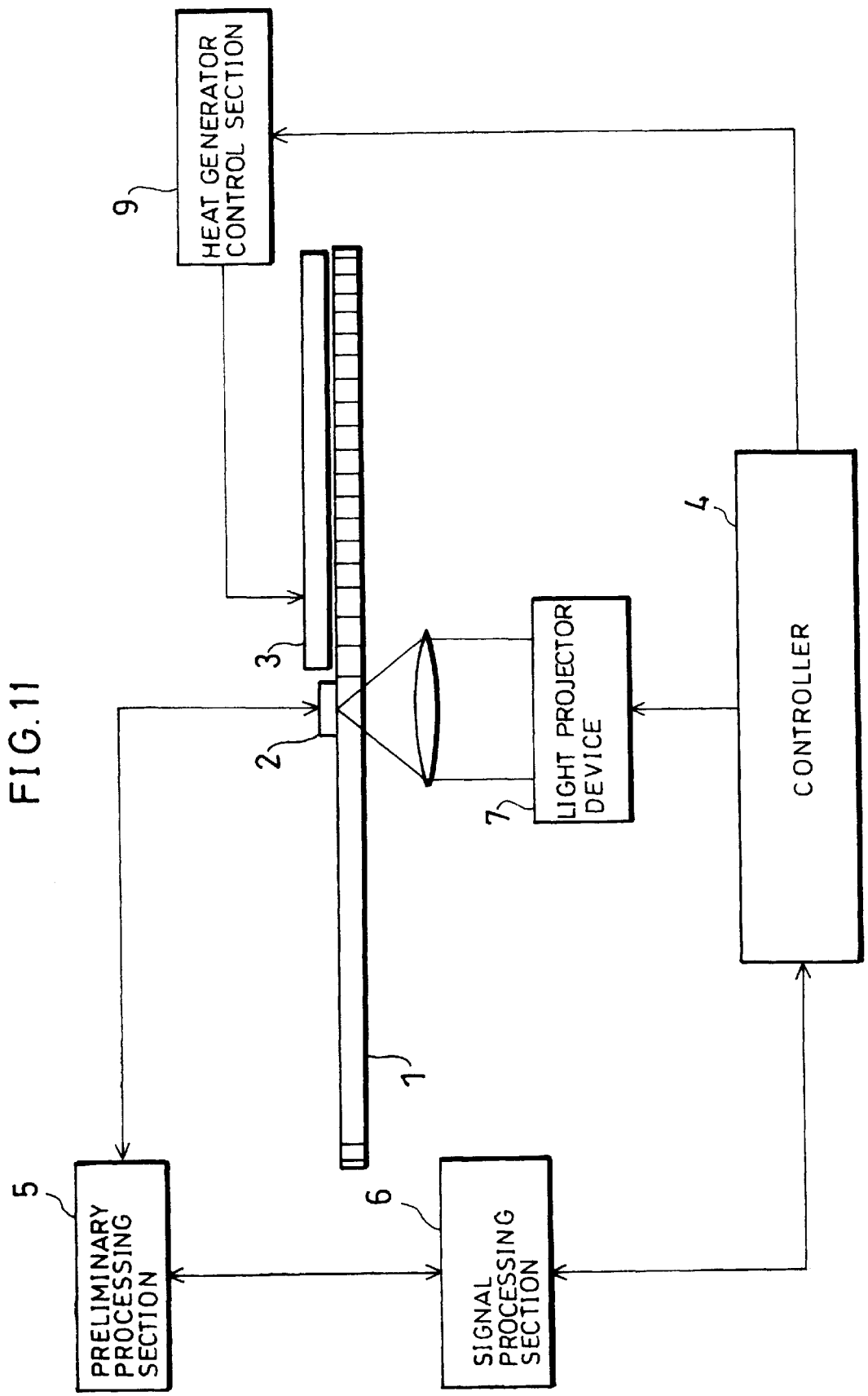
FIG. 11 is an arrangement drawing showing a recording and reproduction device to execute a heat assisted recording and reproduction method of the third embodiment in accordance with the present invention.

FIG. 11 shows a block diagram of a device of the present embodiment. The heat generator 3 is such that a heat generator control section 9 specifies the heating temperature according to a command given by the controller 4. There is also a light projector device 7 for forming the second heated domain 19. The reproduction signal obtainable from the second heated domain 19 is detected by the reproduction-use magnetic head 2 and amplified by the preliminary processing section 5. The signal is further processed by the signal processing section 6 to calculate the jitter value and the error rate before being supplied to the controller 4.

The controller 4 specifies the heating temperature of the heat generator 3 through the heat generator control section 9 so as to minimize the jitter value and the error rate. The controller 4 alternatively may specify the heating temperature of the heat generator 3 through the heat generator control section 9 so as to minimize the signal level of a reproduction signal detected by the reproduction-use magnetic head 2 with the light projector device 7 projecting no light and creating no second heated domain 19.

Figure 12:
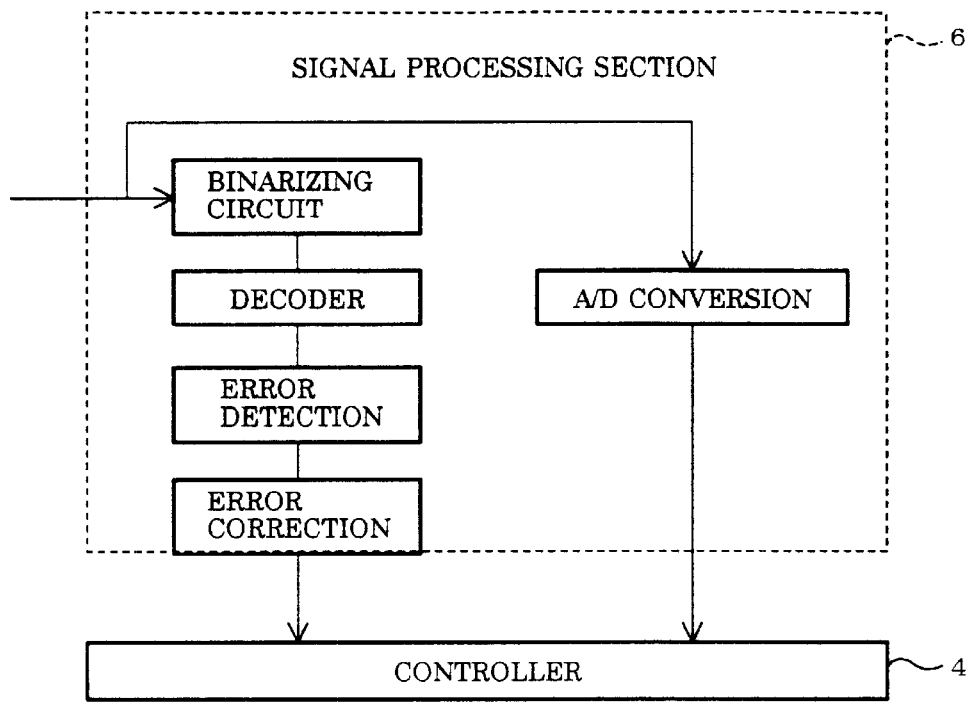
FIG. 12 is an arrangement drawing showing a signal processing section for use with a method of specifying a target temperature for a first heated domain by evaluating a reproduction signal level after A/D conversion without forming a second heated domain, in accordance with the heat assisted recording and reproduction method.

FIG. 12 shows an arrangement of the signal processing section 6 when a signal is converted from analogue to digital to specify the heating temperature. The signal processing section 6 converts an incoming analogue reproduction signal to digital information and supplies the converted signal to the controller 4. The controller 4 specifies the heating temperature of the heat generator 3 through the heat generator control section 9 according to the supplied digital information so as to minimize the reproduction signal.

Figure 13:
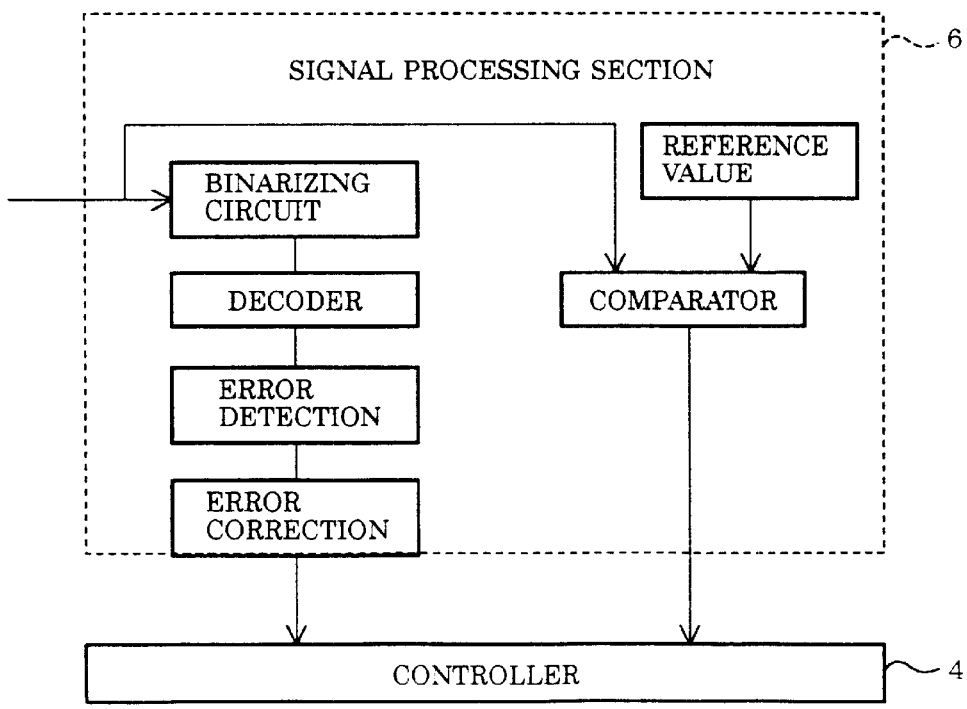
FIG. 13 is an arrangement drawing showing a signal processing section for use with a method of specifying a target temperature for a first heated domain by evaluating a reproduction signal level using a comparator based on a reference value without forming a second heated domain, in accordance with the heat assisted recording and reproduction method.

FIG. 13 shows an arrangement of the signal processing section 6 when a comparator is used to specify the heating temperature. The signal processing section 6 compares an incoming reproduction signal with a predetermined reference value to determine which is greater. The result is supplied to the controller 4 which then specifies the heating temperature of the heat generator 3 through the heat generator control section 9 so as to cause the reproduction signal level to be smaller than the predetermined reference value.

The predetermined reference value is determined according to a tolerable amount of crosstalk from adjacent tracks. Also during recording, the heating temperature of the heat generator 3 maintains the temperature obtained in the foregoing. Exemplary heat radiating bodies 3 includes a ceramic heater.

Further, the heat generator 3 preferably has a rectangle shape long enough to cover the entire length of a radius of the magnetic storage medium 1 from its central portion to its circumference as shown in FIG. 10. The shape and size does not require the heat generator 3 to physically move to record or reproduce information, contributing to manufacture of smaller, thinner and cheaper devices.

Further, when the magnetic storage medium 1 rotates at a constant angular velocity, it is be very useful if the heat generator 3 is specified to have a temperature gradient from the central portion toward the circumference of the magnetic storage medium 1, i.e., the longitudinal direction of the heat generator 3. This is because the linear velocity of the magnetic storage medium 1 is greatest at its circumference and decreases toward the central portion, and if a constant amount of heat is supplied, heat is supplied to the magnetic storage medium 1 in various amounts per unit area.

Specifically, the heat generator 3 used for this kind of magnetic storage medium 1 is preferably specified so that the heating temperature decreases toward the central portion. The specification permits the target temperature of the first heated domain 18 to be quickly specified even when the magnetic head moves on the magnetic storage medium 1 from the central portion to the circumference or from the circumference to the central portion during recording or reproduction.

Embodiment 4

Figure 14:
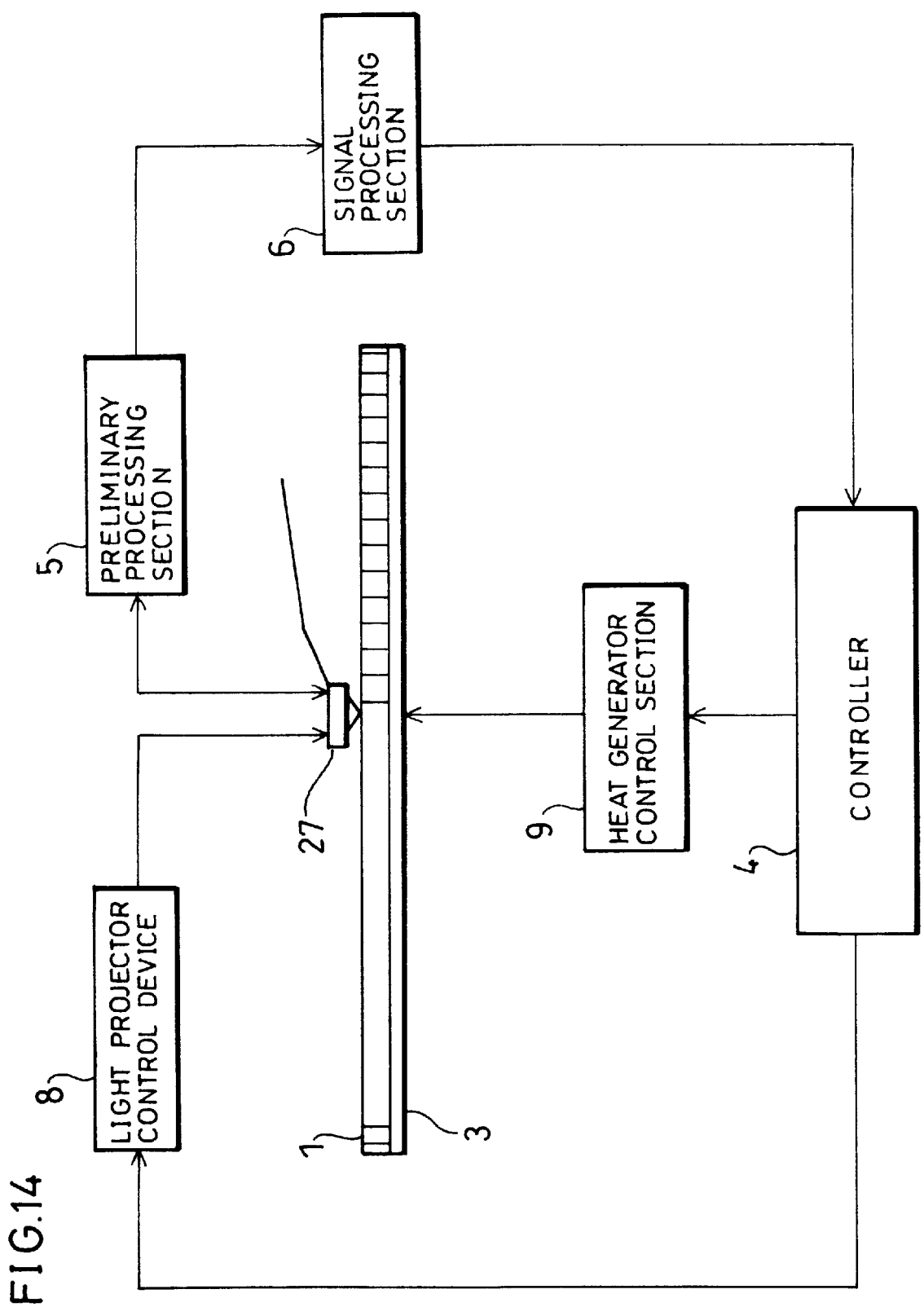
FIG. 14 is an arrangement drawing showing a recording and reproduction device to execute the heat assisted recording and reproduction method of the fourth embodiment in accordance with the present invention.
Figure 15:
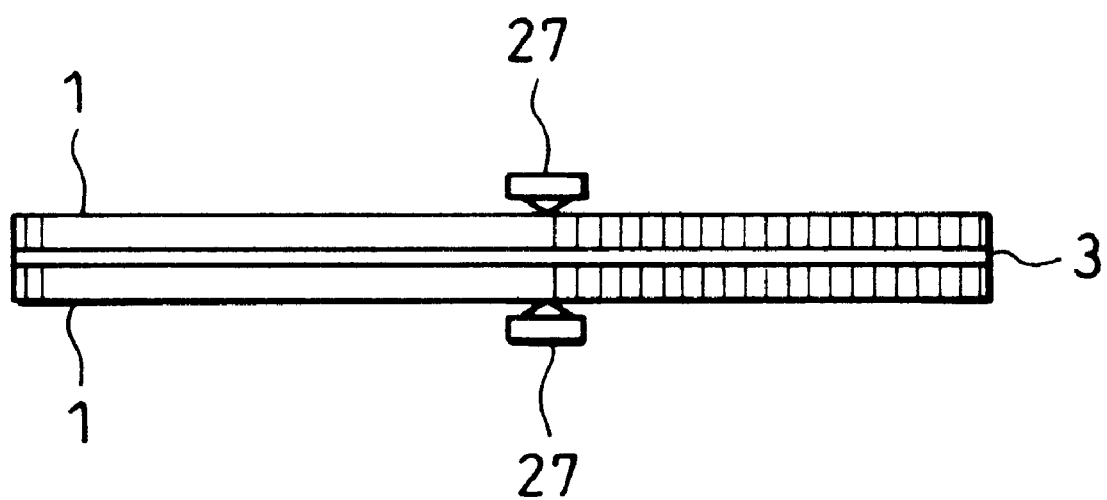
FIG. 15 is an explanatory drawing showing the fourth embodiment in accordance with the present invention in which a double-sided magnetic storage medium is used.

Referring to FIG. 14 and FIG. 15, the following description will discuss the fourth embodiment of the present invention. In the present embodiment, information is recorded and reproduced using a composite head 27. The composite head 27 is a head that doubles as the reproduction-use magnetic head 2 and the light projector device 7 discussed in the first, second, and third embodiments, and is arranged to include a light source, a magnetic field generator section, and a magnetic field detecting section. There is also provided a light projection control section 8 for controlling the light source.

The composite head 27 uses only one side of the magnetic storage medium 1 to record and reproduce information. This completely frees the other side of the magnetic storage medium 1, allowing a disc shaped heat generator 3 covering the entire magnetic storage medium 1 as shown in FIG. 14 to be installed on this other side of the magnetic storage medium 1 concentrically with the magnetic storage medium 1.

Therefore, in the present embodiment, the entire magnetic storage medium 1 serves as first heated domains 18 and has temperatures close to the magnetic compensation temperature. Heat generation by the heat generator 3 can be controlled in the same manner as in the third embodiment. For recording and reproduction of information, the composite head 27 projects light to form a second heated domain 19 which serves as a read-out domain to obtain a desired target temperature.

FIG. 15 shows composite heads applied to a double sided medium. Here, a magnetic storage medium 1 is provided on each opposing side of a heat generator 3, and a composite head 27 is provided on each surface. The two composite heads 27 are capable of simultaneously performing recording or reproduction on the respective surfaces.

The magnetic storage media 1 used in the present arrangement preferably shares at least similar magnetic compensation temperature properties. The heat generator 3 can be provided over the entire magnetic storage medium 1 as in the present embodiment, by disposing on the back of the magnetic storage medium 1 a conductive thin film having a resistant component required for heat generation.

The following description presents analysis of suggestions conventionally made on heat assisted recording methods. According to a conventional heat assisted recording method, a recording domain is heated either for the purpose of reducing the coercive force of the medium or for the purpose of elevating the temperature to a neighborhood of the Curie point of the medium, so as to record information using an external magnetic field.

To see effectiveness of heat assisted magnetic recording, the inventors of the present invention conducted experiments on thermomagnetic recording, using a magnetic storage medium having a magnetic compensation temperature lower than room temperature and a light beam, serving as a heat source, having a spot size of 1.2 $\mu$m.

The magnetic compensation temperature was specified lower than room temperature to allow for occurrence of magnetization at room temperature and thus facilitate magnetic observation of recording domains. The recording power of the light beam was 6 mW, and a simulation showed that the temperature of the magnetic storage medium was elevated by the light beam to a neighborhood of 200° C.

The magnetic storage medium was heated with the light beam to record a signal with a magnetic head. Observation of the recording domains revealed that some recording bits were not formed normally. The inventors of the present invention reached those conclusions detailed below after elaborately considering a variety of factors possibly leading up to this shortcoming.

The recording head used for the heat assisted magnetic recording had a gap length of 0.3 $\mu$m, whereas the light beam measured 1.2 $\mu$m$\phi$. This could be interpreted as the elevated temperature domain being far greater in size than the magnetic field applied domain.

Accordingly, when the recording domain cooled down, there was no more magnetic field being applied by the recording head. Therefore, the external magnetic field affected the recording domain in unforeseeable manners during this cooling process.

The recording domain was not formed normally because it was affected by the external magnetic field other than the magnetic field of the recording head of during the cooling process. We assumed that since the magnetic storage medium exhibiting magnetization at room temperature was used in the experiments that time, the recording domain was affected by magnetization of adjacent tracks in non-elevated temperature recording domains.

From the foregoing, it would be understood that the magnetization of domains adjacent to the recording domain needs to be ignorably small during recording. The conventional technology consequently has problems, during recording also, that there are large negative effects from irregularities of the magnetic compensation temperature of the magnetic storage medium and variations of the ambient temperature.

To solve these problems, a heat assisted recording and reproduction method includes the steps of: preparing a storage medium including as a storage layer a magnetic film exhibiting a magnetic compensation temperature higher than room temperature; specifying a plurality of heated domains on the storage medium, the plurality of heated domains each having a different target temperature from the other(s); and recording and/or reproducing information in the storage layer in one of the heated domains.

Therefore, according to the method, one of the heated domains can be specified to have a temperature that is equal to the magnetic compensation temperature of the storage medium; the heated domain can be thus specified outside the domains where actual recording or reproduction of information takes place. Therefore, according to the method, since magnetization can be prevented from being generated unnecessarily outside the domains, despite possible irregularities in storage medium properties and variations in operational environmental (ambient) temperature, information can be recorded and reproduced highly reliably without being negatively affected by these irregularities in storage medium properties and variations in operational environmental temperature.

The heat assisted recording and reproduction method in accordance with the present invention is preferably such that the storage layer exhibits highly restrained or substantially no magnetization in a first heated domain, which is one of the plurality of heated domains, and the recording domain exhibits a reduced coercive force in a second heated domain, which is another of the plurality of heated domains, so as to record the information using an external magnetic field.

As a result, according to the method, the magnetization can be reduced to substantially zero in a neighborhood recording domain (in the first heated domain). The recording domain (second heated domain) is hence prevented from being affected by the magnetization of its adjacent domains during cooling process, allowing information to be recorded normally.

The heat assisted recording and reproduction method in accordance with the present invention is preferably such that the storage layer exhibits highly restrained or substantially no magnetization in the first heated domain, and an increased magnetization as high as a detection level for a reproduction-use magnetic head in the second heated domain, so as to reproduce the information from an orientation of the magnetization.

As a result, according to the method, the magnetization of the storage medium can be reduced to substantially zero in a neighborhood of the read-out domain (in the first heated domain). Hence, even if the reproduction-use magnetic head detects magnetization in a larger area than the read-out domain (second heated domain) on the storage layer, a reproduction signal is obtained with only a little crosstalk from adjacent domains and a good S/N ratio.

The heat assisted recording and reproduction method in accordance with the present invention is more preferably such that the first heated domain is larger than the second heated domain, and the second heated domain is formed within the first heated domain, for example, so that the second heated domain is encircled by the first heated domain.

As a result, according to the method, information is recorded and/or reproduced in the second heated domain, while magnetization is reduced to substantially zero in the first heated domain that is larger than the second heated domain where information is recorded and reproduced and is more susceptible to negative effects due to its location external to the second heated domain.

Therefore, according to the method, information can be recorded and reproduced in a more stable manner due to restrained magnetic effects of the first heated domain that surrounds the second heated domain where recording and reproduction of information takes place.

According to the method, if the first heated domain and the second heated domain are both specified, for example, of a circular shape, the circles are preferably substantially concentric.

As a result, information is recorded and reproduced in a more stable manner as mentioned earlier, because the recording and reproduction of information actually takes place in the internally located second heated domain, and the magnetization is reduced to substantially zero in the first heated domain that substantially uniformly encircles the second heated domain.

The heat assisted recording and reproduction method in accordance with the present invention is preferably such that the first heated domain is specified not smaller than an area on the storage medium where the reproduction-use magnetic head can detect a magnetic field.

In other words, in accordance with the method, preferably, the first heated domain is specified not smaller than an area on the storage medium where the reproduction-use magnetic head can detect a magnetic field, so that the reproduction-use magnetic head detects no magnetic fields other than the read-out domain during heat assisted information reproduction.

As a result, according to the method, the reproduction-use magnetic head is prevented from detecting a magnetic field that does not originate at the read-out domain of the storage layer; a signal can be reproduced from the read-out domain with a high S/N ratio.

The heat assisted recording and reproduction method in accordance with the present invention is more preferably such that the first heated domain and the second heated domain are formed using a single heat source. As a result, according to the method, the target temperature of the first heated domain and the target temperature of the second heated domain are readily varied in connection with each other.

Incidentally, from the temperature-dependent characteristics of the coercive force and residual magnetization of the magnetic storage medium observed in experiments by the inventors of the present invention, it is understood that the coercive force decreases slightly with an increase in temperature below and around the Curie point, i.e., recording heating temperature that serves as the second heated domain, and is relatively temperature stable. Further, the residual magnetization strength is relatively temperature stable in a neighborhood where it takes a maximum value, that corresponds to the reproduction heating temperature that serves as the second heated domain.

However, the residual magnetization strength is relatively temperature dependent in a neighborhood of the magnetic compensation temperature, that serves as the first heated domain. Also, normally, the temperature of the first heated domain is specified lower than that of the second heated domain.

Considering these characteristics, it is understood the target temperature of the first heated domain needs to be precisely and accurately specified, compared to the target temperature of the second heated domain: in other words, it is important to adjust temperatures while giving top priority to the target temperature of the first heated domain.

According to the method, since a single heat source is used to form the first heated domain and the second heated domain, the target temperature of the first heated domain and the target temperature of the second heated domain are adjusted in connection with each other. Therefore, although the target temperature is not specified very precisely and accurately in the second heated domain, since the magnetic properties are relatively temperature stable as mentioned earlier, recording and reproduction are not in practice seriously affected.

Moreover, the control of the first heated domain and the second heated domain in connection with each other according to the method allows for simplification of the foregoing control means for forming the first heated domain and the second heated domain, which is advantageous in the recording and reproduction system based on the method.

The heat assisted recording and reproduction method in accordance with the present invention is preferably such that the target temperature of the first heated domain and the target temperature of the second heated domain are varied individually.

As a result, according to the method, the target temperature of the first heated domain and the target temperature of the second heated domain are adjusted separately from each other; therefore the properties of the storage layer are well compensated for irregularities. This ensures that, during reproduction, there is substantially no magnetization in the first heated domain and the magnetization strength takes a maximum value in the second heated domain, and similarly that, during recording, there is substantially no magnetization in the first heated domain and the coercive force is reduced in the second heated domain.

The heat assisted recording and reproduction method in accordance with the present invention is preferably such that the target temperature of the first heated domain is specified based on a result of measurement of at least one of the jitter value, the error rate, and the signal level in a reproduction signal derived from the storage medium.

As a result, according to the method, the target temperature is specified precisely and accurately so that there is substantially no magnetization in the first heated domain. That is, the control of the heat source is performed through temperature elevation control on the medium, control of the magnetization strength, detection of a magnetic field by the reproduction-use magnetic head, amplification of the detected signal, processing of the signal, and evaluation of signal quality, forming a closed loop.

Therefore, according to the method, the target temperature can be precisely and accurately specified for the first heated domain, preventing to some degree irregularities in control system and other circuits from destabilizing the temperature specification for the first heated domain. Therefore, the S/N ratio in reproduction signals improves.

The heat assisted recording and reproduction method in accordance with the present invention is preferably such that the target temperature of the first heated domain is specified based on evaluation of reproduction of information stored in an evaluation domain specified in advance.

As a result, according to the method, the quality of a reproduction signal is evaluated quickly. Here, it is extremely useful if the information stored in the evaluation domain is specified in advance. That is, signal quality is evaluated based on fixed information, the evaluation is readily done, and accuracy in the evaluation improves. That information specified in advance may be, for example, simple pattern information, a single frequency, or a random pattern.

Further, according to the method, the user data domain can be separated from the evaluation domain, which is advantageous in reducing the risk of damaging user data by unforeseeable accident during the specification of the target temperature.

Alternatively, according to the method, a plurality of evaluation domains may be provided on the storage medium. This is to allow for variations in the amount of heat supplied per unit area on the storage medium, the variations being caused by difference in the linear velocity of the storage medium between the central portion and the circumference if the storage medium rotates at a constant angular velocity and fed with a constant amount of heat.

Hence, according to the method, preferably, a plurality of evaluation domains are provided over the storage medium between the central portion and the circumference, and the evaluation domains are used individually to obtain a reproduction signal by which the target temperature of the first heated domain is specified. Moreover, according to the method, an access only needs to be made to the nearest evaluation domain to evaluate quality of a reproduction signal, which is advantageous in reducing access time.

The heat assisted recording and reproduction method in accordance with the present invention is preferably such that the target temperature of the first heated domain is varied during standby for recording or reproduction. As a result, according to the method, the target temperature can be adjusted without negatively affecting actual recording or reproduction operation.

The heat assisted recording and reproduction method in accordance with the present invention is preferably such that the first heated domain is heated using laser light. According to the method, by using laser light, the target temperature can alter quickly in proportion to light amount, and the position of the heated domain can be precisely controlled.

The heat assisted recording and reproduction method in accordance with the present invention may be such that the first heated domain is heated using Joule heat generated by a resistant component. According to the method, by using Joule heat, a simple arrangement can heat over a very large area.

Embodiment 5

Figure 16:
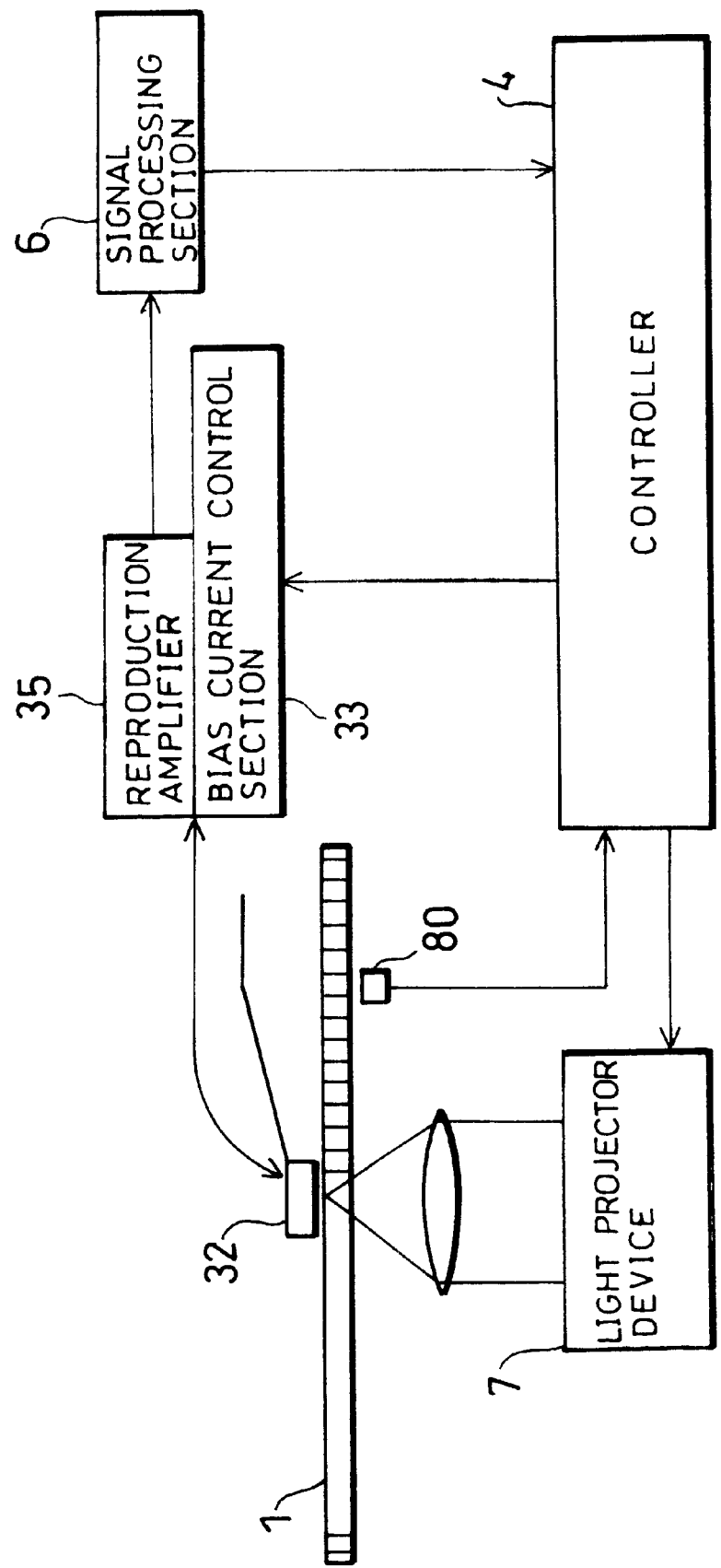
FIG. 16 is a block diagram showing an arrangement of a device for reproducing information by a heat assisted recording and reproduction method of the fifth embodiment in accordance with the present invention.
Figure 17:
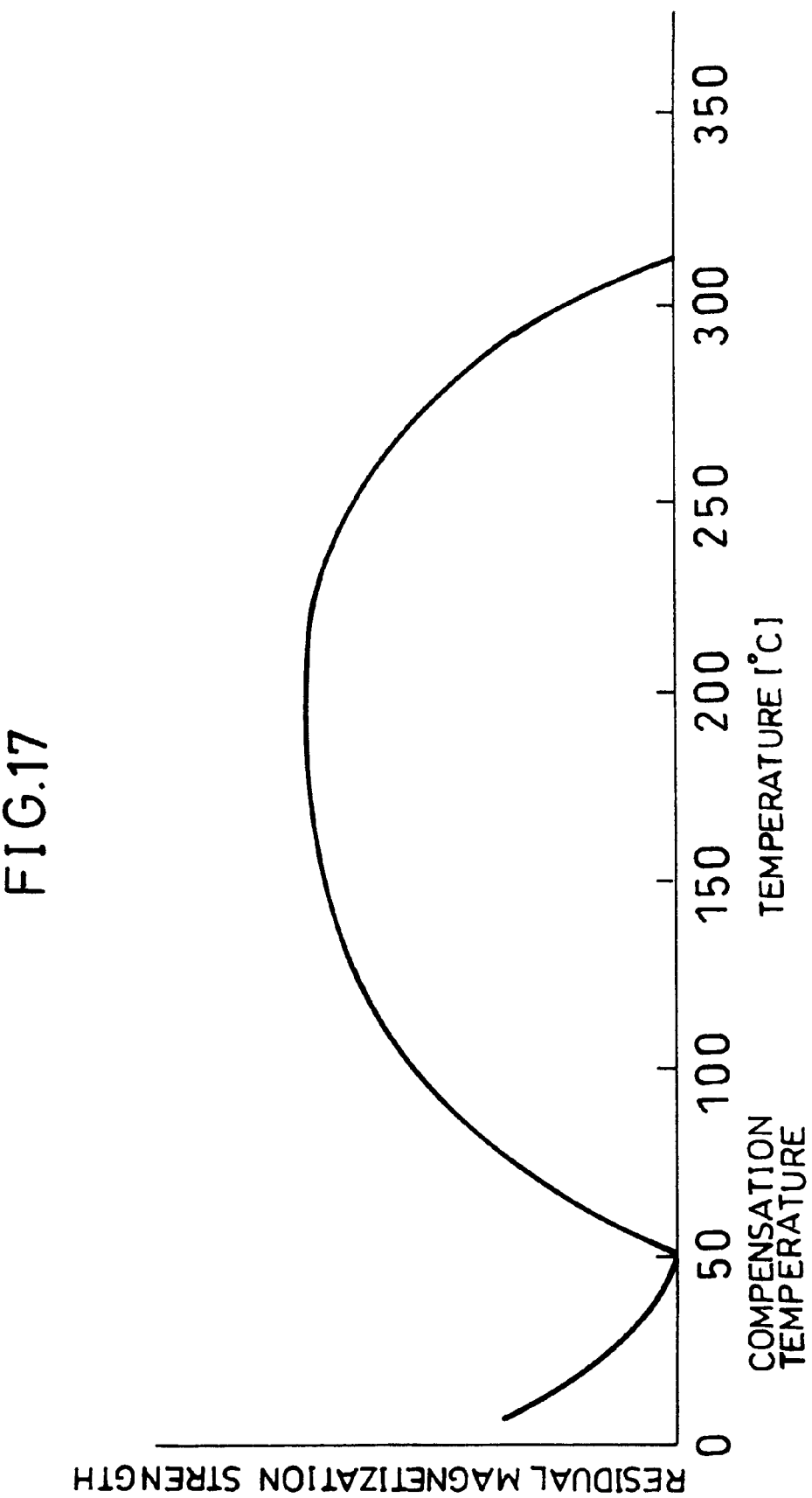
FIG. 17 is a graph showing temperature-dependent characteristics of the residual magnetization strength of the foregoing magnetic storage medium.

Referring to FIG. 16 to FIG. 18, the following description will discuss the fifth embodiment in accordance with the present invention. As shown in FIG. 16, the magnetic storage medium 1 used in the present invention may be the one discussed in the foregoing first embodiment. FIG. 17 is a graph showing temperature-dependent characteristics of a magnetic film obtained from the magnetic storage medium 1 by magnetizing the magnetic film at high temperatures where it exhibits a relatively low coercive force and thereafter measuring the residual magnetization of the magnetic film at various gradually falling temperatures.

This magnetic storage medium 1 was used to experiment with recording and reproduction of a signal. An MR head 32 used measured about 5 $\mu$m in gap width perpendicular to the track direction, and a light spot measured about 1.2 $\mu$m$\phi$. Light power used for the experiment was about 6 mW both during recording and during reproduction. The rotation rate of the magnetic storage medium 1 was 3600 rpm and the recording frequency was 2 MHz.

FIG. 18(a) shows signals obtained from reproduction of information by a heat assisted method, the information being stored in a single track on the magnetic storage medium 1. FIG. 18(b) shows reproduction signals when no light beam is projected. It is understood from these figures that variations in signal levels corresponding to a light-beam-projection time and a no-light-beam projection time is similar to what is presumed from those temperature-dependent characteristics shown in FIG. 17.

In this manner, the use of the magnetic storage medium 1 in accordance with the present invention has made it possible with an MR head 32 for the first time to take a satisfactory advantage of a reproduction signal with a good S/N ratio, which is an objective of heat assisted recording and reproduction methods.

From this set of experiments, it was understood that the MR head 32 elevated the temperature of the magnetic storage medium 1 to about 25° C. higher than ambient temperature. This means that with ambient temperature being elevated as high as 70° C., the magnetic storage medium 1 is cooler than 100° C.

Consequently, the temperature outside the read-out domain, i.e., outside the area where light beam is projected, of the storage layer of the magnetic storage medium 1 is substantially separated from a temperature range of 150° C. to 250° C., that is, values which the temperature of the read-out domain in a magnetic film of the magnetic storage medium 1 reaches. Crosstalk does not therefore occur during reproduction.

To take the full advantage of positive effects of heat assisted reproduction, the magnetic compensation temperature of the magnetic storage medium 1 is preferably specified to an ambient temperature that is higher than room temperature by the increase caused by the heat generated by the MR head 32. In such an event, the residual magnetization of the magnetic film can be minimized in areas where no light is projected as mentioned earlier, that is, outside the read-out domain.

The magnetic storage medium 1 in accordance with the present invention is particularly effective when it is installed in a closed space together with a head in a magnetic recording and reproduction device, like a typical hard disk drive, for the encapsulated magnetic storage medium and head are advantageous in stably performing heat assisted reproduction.

Embodiment 6

Referring to FIG. 16 and FIG. 19, the following description will discuss the sixth embodiment in accordance with the present invention. First, an explanation will be given on how information is reproduced by a heat assisted recording and reproduction method in accordance with the present invention. The controller 4 causes the light projector device 7 to project a light beam to a read-out domain of the magnetic storage medium 1, and the MR head 32 detects, as information, the orientation of magnetization in the read-out domain heated by the projection.

The MR head 32 receives a bias current during reproduction from a bias current control section 33, supplies information as a reproduction signal output according to the bias current and a variation in resistance caused by a change in the orientation of magnetization of the read-out domain (magneto-resistance effect). The reproduction signal is amplified and shape-modified by a reproduction amplifier 35, and supplied to the signal processing section 6. Further, the bias current control section 33 is arranged to be capable of adjusting and/or modifying the bias current applied to the MR head 32 based on a command from the controller 4.

FIG. 19 shows the relationship between the bias current and the amount of heat generated by the MR head 32. FIG. 19 clearly shows that the amount of heat generated by the MR head 32 alters with the bias current value and is controllable-through the control of the bias current.

Accordingly, in the heat assisted recording and reproduction method using the aforementioned magnetic storage medium 1, the adjustment of the bias current value using the controller 4 enables compensation for, i.e., reduction of, instability of reproduction operation caused by deviation of the magnetic compensation temperature caused by irregularities in the composition of the magnetic film of the magnetic storage medium 1.

Further, the reproduction signal supplied by the MR head 32 is transmitted via the signal processing section 6 to the controller 4, enabling the controller 4 to evaluate quality of a reproduction signal. Thus, the controller 4 is capable of adjusting the bias current of the MR head 32 in real time while evaluating quality of a reproduction signal; the bias current can be specified according to changes in reproduction conditions. Reliability in reproduction operation can improve.

Quality of a reproduction signal is preferably evaluated by way of, for example, determining the bias current by taking an amount of crosstalk into consideration. In such an event, the amount of crosstalk per se is difficult to evaluate, and is preferably evaluated by way of an index reflecting the amount of crosstalk: as previously mentioned, the jitter value or the error rate is preferably used for this purpose (see FIG. 5 and FIG. 6).

In the present embodiment, since negative effects on adjacent tracks caused by the heat distribution on the magnetic storage medium 1 are taken into consideration, information is reproduced with very high reliability. Besides, quality of a reproduction signal can be evaluated by using a detection signal derived from the outside of the read-out domain, that is, from non-heated domains. In other words, without elevating the temperature of the magnetic storage medium 1 (i.e., with no light beam being projected onto the magnetic storage medium 1), the level of the reproduction signal from the MR head 32 can be evaluated, and the bias current can be specified. In an event where the bias current is specified in this manner, the bias current can be specified in the same manner as, for example, in the aforementioned control of the heating temperature in reference to FIG. 12 and FIG. 13, and therefore description thereof is omitted.

So far, three methods, i.e., measurement of jitter value, that of error rate, and that of signal level, have been described as methods of evaluating quality of a reproduction signal; however, the bias current of the MR head 32 may be specified by combining results of at least two of these measuring methods. In such an event, the current can be specified with even higher reliability.

Also when the MR head 32 is used in this manner, as previously mentioned, information stored in advance in the evaluation domain 28 may be reproduced for evaluation. Further, a plurality of evaluation domains 28 may be provided on the magnetic storage medium 1.

The foregoing evaluation of reproduction is preferably performed during standby for recording or reproduction of information. The foregoing evaluation of reproduction, if performed during standby, can be prevented from affecting actual recording and reproduction operation, successfully avoiding degradation of recording and reproduction capabilities of a magnetic recording and reproduction device due to the specification of a bias current.

Embodiment 7

Figure 20:
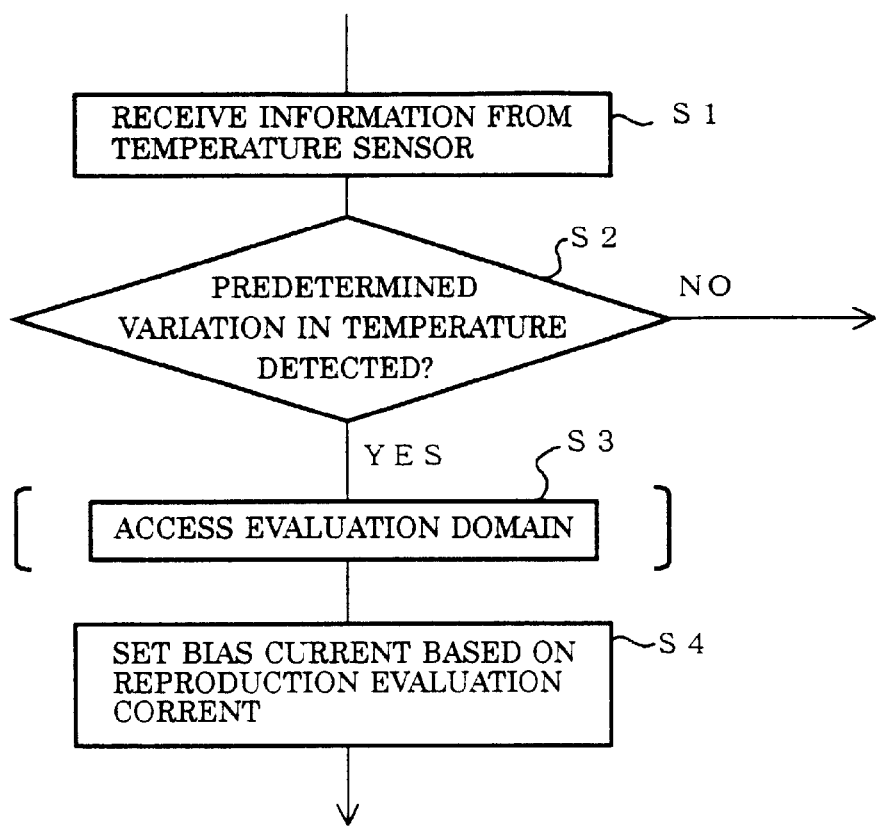
FIG. 20 is a flow chart showing steps carried out according to a method of specifying a bias current for the head based on results obtained from an evaluation of reproduction when a temperature sensor installed in a periphery of the medium detects a predetermined temperature variation, in accordance with the heat assisted recording and reproduction method.

Referring to FIG. 16 and FIG. 20, the following description will discuss the seventh embodiment of the present invention. In the present embodiment, as shown in FIG. 16, a temperature sensor 80 is disposed in a neighborhood of a read-out domain (a reproduction domain) on the magnetic storage medium 1.

FIG. 20 shows a flow chart showing a process of bias current specification using the temperature sensor 80. As shown in FIG. 20, the temperature sensor 80 monitors ambient temperature of the magnetic storage =medium 1, and supplies temperature information to the controller (Step 1; hereinafter, "Step" will be abbreviated as "S"); from the temperature when the bias current was specified last time, the controller 4 determines whether or not a predetermined temperature variation has occurred (S2).

If the predetermined temperature variation has occurred, quality of a reproduction signal is evaluated, and the bias current is specified based on the results (S4). Note that if the evaluation of reproduction signal quality is executed using a evaluation domain 28, an access operation step (S3) is needed before the evaluation step S4.

A predetermined temperature variation is estimated as follows. The tolerable amount of crosstalk from adjacent tracks is referred to as, for example, 0.05×Mr(max), where Mr(max) is a maximum magnetization strength of residual magnetization and ΔMr is a temperature dependency of the magnetization strength in a neighborhood of the magnetic compensation temperature. The tolerable temperature variation ΔT is then derived from 0.05×Mr(max)/ΔMr.

Specifically, the inventors of the present invention conducted an experiment on a sample and obtained Mr(max) of 120 emu/cc and ΔMr of 0.8 emu/cc/° C. From these figures, the tolerable temperature variation, ΔT, of 7.5° C. was obtained. It was thus found that the tolerable predetermined temperature variation in that case should not exceed 7.5° C. In practice, 5° C. will be appropriate for safety reasons.

If a stronger limitation is imposed on the tolerable amount of crosstalk, the tolerable temperature variation becomes smaller, and the predetermined temperature variation also becomes smaller accordingly. That is, the predetermined temperature variation is determined by the tolerable amount of crosstalk and the temperature dependency of the magnetization strength in a neighborhood of the magnetic compensation temperature.

Embodiment 8

Figure 21:
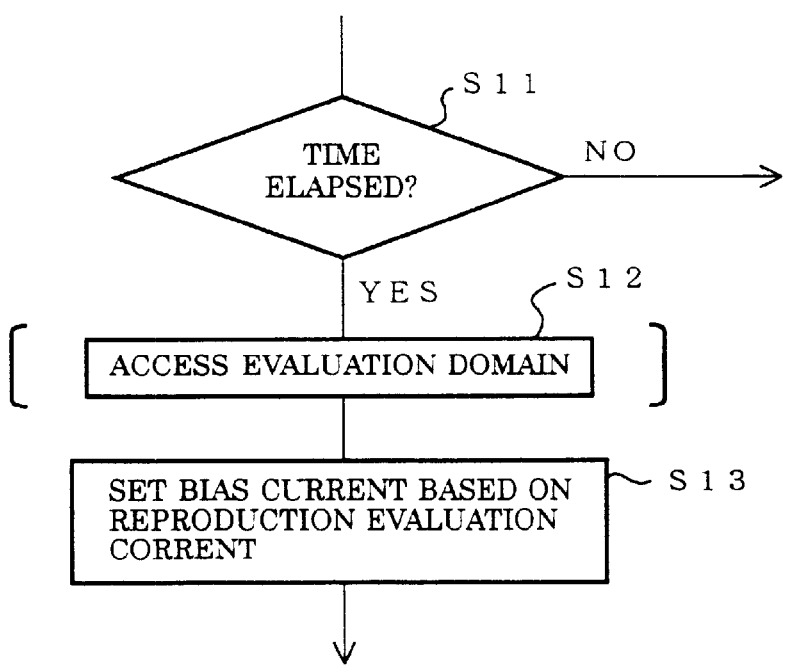
FIG. 21 is a flow chart showing steps carried out according to a method of specifying a bias current for the head based on results obtained from an evaluation of reproduction performed at a regular interval, in accordance with the heat assisted recording and reproduction method.

Referring to FIG. 16 and FIG. 21, the following description will discuss the eighth embodiment in accordance with the present invention. In the present embodiment, as shown in the flow chart in FIG. 21, the controller 4 activated a built-in timer function (not shown) when the bias current was specified last time, and if a predetermined time has elapsed (S11), the controller 4 performs evaluation of reproduction signal quality, and specifies the bias current again based on evaluation results (S13). Note that if the evaluation of reproduction signal quality is executed using a evaluation domain 28, an access operation step (S12) is needed before the evaluation step S13.

The predetermined time used here is calculated from changes in ambient temperature of the magnetic storage medium 1 over a period of time. A most important thing is that signal quality is preferably evaluated at short time intervals at a startup and during a predetermined time period that follows the startup, since it is highly likely under typical conditions that ambient temperature of the magnetic storage medium 1 changes rapidly at a startup of a magnetic recording and reproduction device. Meanwhile, the predetermined time may be extended, if it takes longer than the predetermined time for the internal temperature of the magnetic recording and reproduction device for use with the heat assisted recording and reproduction method in accordance with the present invention to reach steady state after the startup.

Embodiment 9

Figure 22:
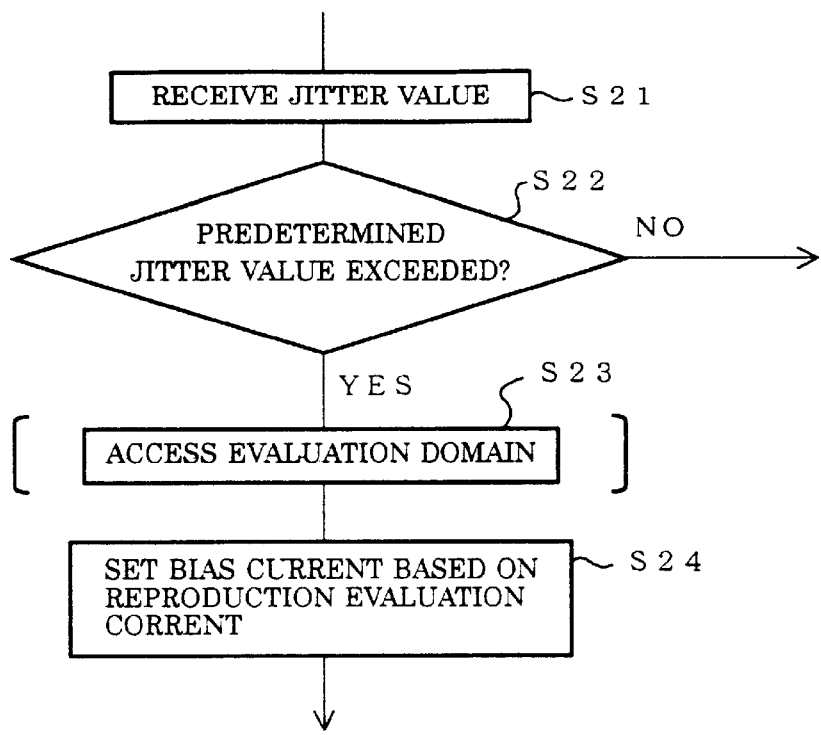
FIG. 22 is a flow chart showing steps carried out according to a method of specifying a bias current for the head when the jitter value of a reproduction signal exceeds a predetermined jitter value in monitoring, in accordance with the heat assisted recording and reproduction method.

Referring to FIG. 5 and FIG. 22, the following description will discuss the ninth embodiment 9 in accordance with the present invention. A method of making an access to an evaluation domain 28 will be discussed below. First, as shown in FIG. 5, in an information reproduction step, a read-out analogue signal is binarized and converted to a digital signal by the signal processing section 6. Thereafter, the digital information is decoded, and error is detected and corrected accordingly.

The signal processing section 6 is arranged so as to be capable of measuring the jitter value of the digital signal obtained from the binarization. The measurement of the jitter value is supplied to the controller 4 (S21) as shown in the flow chart in FIG. 22. The controller 4 determines whether or not the incoming jitter value exceeds a predetermined value (S22).

The controller 4 is arranged so that upon determination that the jitter value exceeds the predetermined value, it can alter, i.e., re-specify, the bias current (S24) to cause the jitter value to be smaller than the predetermined value. If the bias current is altered using an evaluation domain 28, an access operation step (S23) precedes S24. If the controller 4 fails to cause the jitter value to be smaller than the predetermined value, the controller 4 preferably gives a warning and suspends the reproduction operation.

The predetermined jitter value preferably does not exceed 10% the shortest time width of a detected digital signal (binary signal). Generally, the error rate before correction is $10^{-5}$ or smaller if the predetermined jitter value does not exceed that 10%.

Embodiment 10

Figure 23:
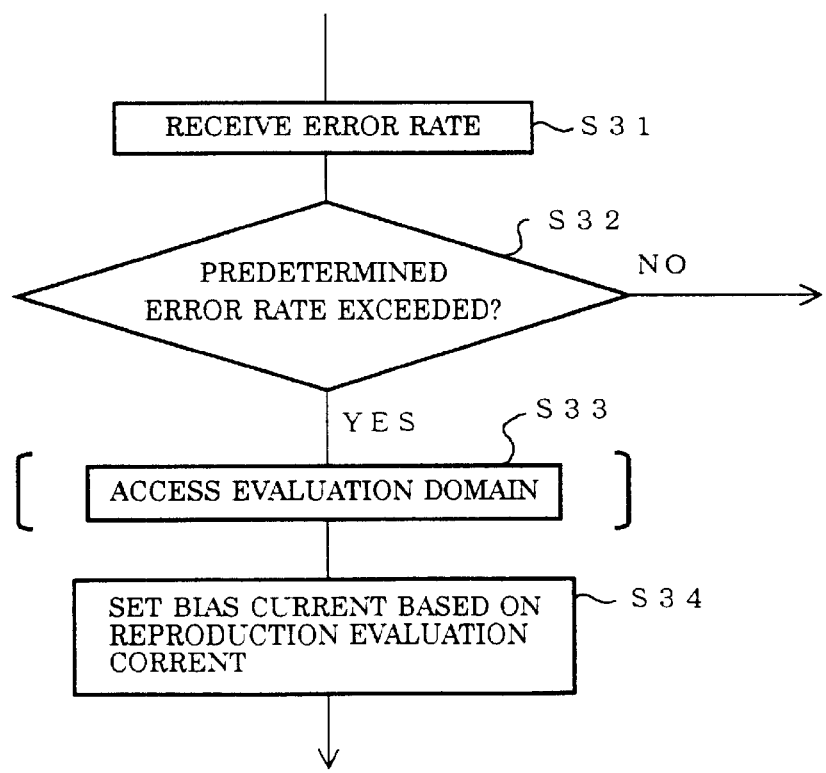
FIG. 23 is a flow chart showing steps carried out according to a method of specifying a bias current for the head when the error rate of a reproduction signal exceeds a predetermined error rate in monitoring, in accordance with the heat assisted recording and reproduction method.
Figure 26:
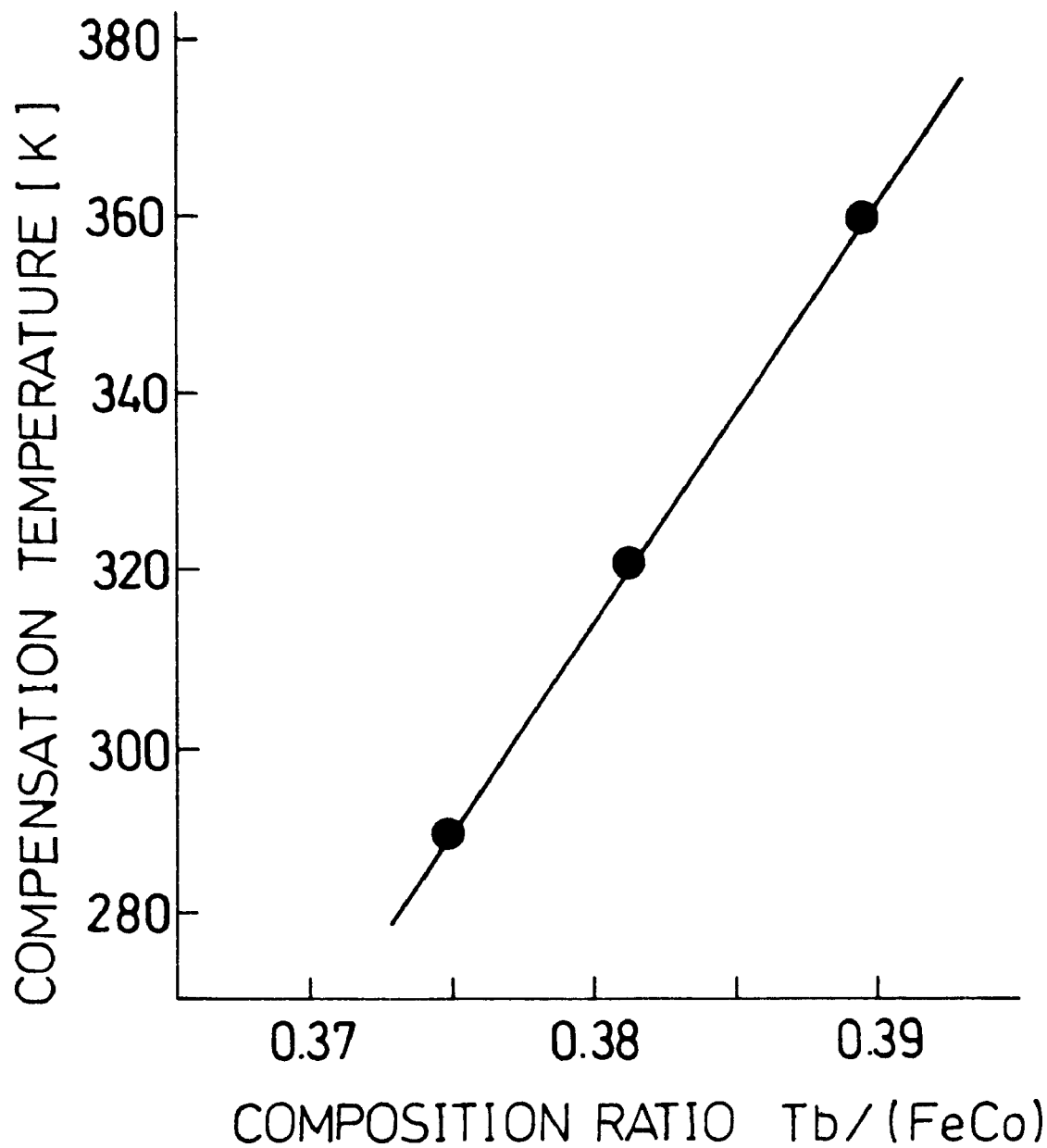
FIG. 26 is a graph showing dependency of the magnetic compensation temperature on the composition ratio of a magnetic body of a storage layer of a magnetic storage medium.

Referring to FIG. 6 and FIG. 23, the following description will discuss another method of making an access to the evaluation domain 28 as the tenth embodiment in accordance with the present invention. In the present embodiment, as shown in FIG. 6, in an information reproduction step, the signal processing section 6 decodes retrieved information, and detects and corrects error accordingly. Here, the signal processing section 6 is arranged so as to be capable of calculating an error rate from error detection frequency. The calculated error rate is, as shown in the flow chart in FIG. 23, supplied to the controller 4 (S31) which determines whether not the incoming error rate exceeds a predetermined value (S32).

The controller 4 is arranged so that upon determination that the error rate exceeds the predetermined value, it can alter, i.e., re-specify, the bias current (S34) to cause the error rate to be smaller than the predetermined value. If the bias current is altered using an evaluation domain 28, an access operation step (S33) precedes S34.

If the controller 4 fails to cause the error rate to be smaller than the predetermined value, the controller 4 preferably gives a warning and suspends the reproduction operation. The predetermined error rate preferably does not exceed $10^{-5}$. Generally, if the error rate does not exceed $10^{-5}$, the error rate after correction is $10^{-12}$ or smaller, assuring performance of the magnetic recording and reproduction device for use with the heat assisted recording and reproduction method in accordance with the present invention.

The inventors of the present invention conducted various experiments on heat assisted magnetic recording and reproduction using an MR head and a magnetic storage medium having a ferrimagnetic material as a storage layer exhibiting a compensation temperature that approximates room temperature; the following description will discuss problems found in the experiments and measures to solve those problems.

An MR head used was specified to about 5 $\mu$m in gap width perpendicular to the track direction, and a light spot was specified to measure about 1.2 $\mu$m$\phi$. Light power was specified to about 6 mW both during recording and during reproduction. The disk rotation rate was specified to 3600 rpm and the recording frequency was specified to 2 MHz.

FIG. 24(a) shows signals obtained from reproduction of information by a heat assisted method, the information being stored in a single track on the magnetic storage medium. FIG. 18(b) shows reproduction signals when no light beam is projected. It is understood from FIG. 24(a) and FIG. 24(b) that a larger reproduction signal amount was obtained when a light beam was projected. However, the reproduction signal amount did not decrease as we expected (detailed later) when no light beam was projected: the signal level fell only about a quarter.

FIG. 25 shows temperature-dependent characteristics of residual magnetization of an experimental magnetic storage medium, observed using a VSM (Vibrating Sample Magnetometer). The temperature-dependent characteristics were obtained by magnetizing a magnetic storage medium at high temperatures and measuring residual magnetization strengths at various falling temperatures. The magnetic storage medium was heated to a neighborhood of about 200° C. with a light power of 6 mW. According to the temperature-dependent characteristics shown in FIG. 25, the residual magnetization amount at room temperature decreased to 10% at 200° C., or further.

It was predicted from those temperature-dependent characteristics that a fall in the reproduction signal that was approximately as large as this decrease would be observed in the results of experiments illustrated in FIG. 24 due to the sensitivity of the MR head that was substantially in direct proportion to the residual magnetization.

However, as mentioned earlier, about a quarter of that fall was observed in the results of experiments illustrated in FIG. 24. From this result of experiment, we assumed that the magnetic storage medium was heated to a temperature higher than room temperature with no light beam being projected.

From calculation based on the results of experiment shown in FIG. 24 and the temperature-dependent characteristics shown in FIG. 25, the magnetic storage medium was predictably heated to about 50° C. with no light beam being projected. Since the experiment was conducted at room temperature of 25° C., the increment of the temperature of the magnetic storage medium equaled 25° C.

This outcome indicates that there existed a heat source other than the light beam. Since the only additional heat source other than the light beam was the MR head, the inventors of the present invention reached a conclusion that the MR head heated the magnetic storage medium.

An MR head, a GMR head, and other heads using magneto-resistance effect detect a magnetic field strength in terms of resistance variations during reproduction, and therefore always needs to be fed with a bias current. The bias current predictably generated Joule heat in the head, serving as a heat source.

As an evidence for this assumption, the inventors of the present invention confirmed through experiment that a thin film head, which did not need a bias current during reproduction, yielded a lower reproduction signal level, but a larger decrease than an MR head.

Therefore, the use of an MR head resulted in heating of a recording domain of the magnetic storage medium corresponding to the size of the head to temperatures higher than room temperature, and a magnetic flux leaking from the magnetic storage medium without projecting a light beam. This means that the MR head detected a leakage magnetic flux originating at a domain to which no light beam is projected during reproduction by means of projection of a light beam. The leakage magnetic flux appeared as crosstalk imposed-on the reproduction signal.

From the foregoing, a problem clearly emerged that a heat assisted method failed to show its advantages during reproduction with a combination of an MR head and a conventionally suggested magnetic recording and reproducing medium, for use with heat assisted recording and reproduction, that had a compensation temperature near room temperature. This held true with the use of a GMR head and other heads using magneto-resistance effect which required a bias current.

A magnetic storage medium in accordance with the present invention, in order to solve the problem, is arranged so that the magnetic compensation temperature of a recording domain is specified higher than room temperature. Therefore, in the arrangement, the residual magnetization can be minimized in the recording domain other than a heated read-out domain even if information recorded in the recording domain is reproduced by magneto-resistance effect using a head which in practice functions as a heat source.

Therefore, in the arrangement, crosstalk can be restrained from the recording domain other than the readout domain, the S/N ratio in a reproduction signal from the read-out domain improves.

The magnetic storage medium in accordance with the present invention may be arranged so that the magnetic compensation temperature is specified higher than necessary by the elevation in the temperature of the recording domain caused by heat generation by the head using magneto-resistance effect.

Consequently, in the arrangement, since the residual magnetization can be minimized outside the read-out domain despite heating by the head, information can be reproduced with restrained crosstalk, which meets the object of the heat assisted reproduction. Consequently, the S/N ratio of the reproduction signal improves.

The heat assisted recording and reproduction method in accordance with the present invention is such that when recorded information is reproduced from the magnetic storage medium using a head exhibiting magneto-resistance effect, the bias current applied to the head is altered according to the temperature of the recording domain.

Therefore, according to the method, by adjusting the bias current, heat generation by the head can be controlled, and the residual magnetization can be minimized in recording domains surrounding the read-out domain opposite the head. Therefore, according to the method, the deviation caused in the magnetic compensation temperature by irregularities in the composition of the recording domain can be compensated for, and the S/N ratio in the reproduction signal can improve.

The heat assisted recording and reproduction method in accordance with the present invention may be such that the bias current is specified based on a result of measurement of at least one of the jitter value, the error rate, and the signal level in a reproduction signal derived from the recording domain, Therefore, according to the method, the control in specifying the bias current forms a closed loop, which enables the bias current to be specified accurately; negative effects from irregularities in a control system and other circuits can be restrained, and the S/N ratio in a reproduction signal can improve. Further, since evaluation is executed during actual reproduction operation, the S/N ratio of a reproduction signal can improve in accordance with reproduction conditions.

Further, the heat assisted recording and reproduction method in accordance with the present invention may be such that the bias current is specified by reproducing information stored in an evaluation domain specified in advance in the recording domain.

According to the method, since the evaluation i s done on quality of a signal obtained from reproduction of information stored in advance in the evaluation domain specified in advance on the recording domain, the evaluation can be done quickly and easily. As a result, th e bias current applied to the head can be specified quickly.

Here, that information specified in advance is stored in the evaluation domain is very useful in facilitating signal quality evaluation and improving evaluation accuracy: examples of information specified in advance includes simple pattern information, a single frequency, and a random pattern.

Further, separating the user data domain from the evaluation domain is advantageous in reducing the risk of damaging user data by unforeseeable accident during the specification of the bias current.

The heat assisted recording and reproduction method in accordance with the present invention may be such that a plurality of evaluation domains are provided. According to the method, further, since a plurality of evaluation domains are provided on the recording domain, if, for example, a disk-shaped medium is rotated at a constant angular velocity, the linear velocity differs between the central portion and the circumference of the disk-shaped medium. The difference in the linear velocity alters the elevation of the head, as well as alters the effects of the head-generated heat on the recording domain.

Consequently, according to the method, the provision of a plurality of evaluation domains between the central portion and the circumference in recording domains on a disk-shaped medium allows more elaborate specification of the bias current applied to the head and enhances reliability in reproduction of information.

The heat assisted recording and reproduction method in accordance with the present invention may be such that the bias current is altered during standby for recording or reproduction. According to the method, since the bias current is specified during standby for recording or reproduction, the bias current can be specified without negatively affecting actual recording or reproduction operation.

The heat assisted recording and reproduction method in accordance with the present invention may be such that the bias current is specified based on a result of measurement of at least one of the jitter value, the error rate, and the signal level in a reproduction signal if a predetermined temperature variation is detected in temperature in a neighborhood of a read-out domain in the recording domain.

According to the method, the bias current applied to the head is determined based on a result of evaluation that is conducted on reproduction signal quality when a predetermined temperature variation is detected in temperature in a neighborhood of a read-out domain in the recording domain; therefore, the bias current can be specified allowing for effects on the storage medium by variations in ambient temperature. Consequently, according to the method, reliability can be enhanced in reproduction of information.

The heat assisted recording and reproduction method in accordance with the present invention may be such that the bias current is specified based on a result of measurement of at least one of a jitter value, an error rate, and a signal level in a reproduction signal at every certain time interval.

According to the method, the bias current is specified based on a result of evaluation of reproduction signal quality at every certain time interval: therefore the bias current can be more elaborately and correctly specified in accordance with changes in reproduction conditions without a dedicated sensor.

The heat assisted recording and reproduction method in accordance with the present invention is preferably such that the bias current is re-specified when the jitter value of a reproduction signal exceeds a predetermined value. According to the method, the bias current is re-specified if the jitter value of a reproduction signal obtained during a reproduction process of information exceeds a predetermined value; therefore the bias current can be specified in accordance with reproduction conditions with high reliability.

The heat assisted recording and reproduction method in accordance with the present invention is preferably such that the bias current is re-specified when the error rate of a reproduction signal exceeds a predetermined value. According to the method, the bias current is respecified if the error rate of a reproduction signal obtained during a reproduction process of information exceeds a predetermined value; therefore the bias current can be specified in accordance with reproduction conditions with high reliability.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A magnetic storage medium, comprising a storage layer for use in heat assisted recording and reproduction whereby information is magnetically recorded and reproduced by heating a recording domain, wherein saturated magnetization of the storage layer has a maximum value at a temperature between a magnetic compensation temperature and a Curie point, said temperature being specified to be in a range between 150° C. and 250° C., and the magnetic compensation temperature of the storage layer is specified to be higher than room temperature in a range between 40° C. and 100° C.

2. The magnetic storage medium as set forth in claim 1, wherein the magnetic compensation temperature of the storage layer is specified to be between about 43° C. and about 80° C.

3. The magnetic storage medium as set forth in claim 1, wherein a magnetic compensation temperature of the recording domain is specified according to a temperature to which the recording domain is heated by the head generating heat during reproduction of information by magneto-resistance effect.

4. A heat assisted recording and reproduction method, comprising the steps of:

preparing a storage medium including as a storage layer a magnetic film exhibiting a magnetic compensation temperature higher than room temperature;

specifying a plurality of heated domains on the storage medium according to said magnetic compensation temperature; and selectively heating each of the plurality of heated domains to different target temperatures from one another such that said storage layer exhibits (i) highly restrained or substantially no magnetization in ones of said plurality of heated domains heated to one of said target temperatures;

(ii) a reduced coercive force in ones of said heated domains heated to another of said target temperatures for recording information therein using an external magnetic field; and (iii) an increased magnetization as high as a detection level for a reproduction-use magnetic head in ones of said plurality of heated domains heated to a target temperature different from both said one and said another of said different target temperatures for reproducing information from an orientation of the magnetization using a reproduction-use magnetic head.

5. The heat assisted recording and reproduction method as set forth in claim 4, wherein the heated domains that exhibit highly restrained or substantially no magnetization are larger than the heated domains that exhibit a reduced coercive force, and the heated domains that exhibit a reduced coercive force are formed within the heated domains that exhibit highly restrained or substantially no magnetization.

6. The heat assisted recording and reproduction method as set forth in claim 4, wherein
the heated domains that exhibit highly restrained or no magnetization are larger than the heated domains that reproduce information from an orientation of the magnetization using the reproduction-use magnetic head, and the heated domain domains that reproduce information from an orientation of the magnetization using the reproduction-use magnetic head are formed within the heated domain domains that exhibit highly restrained or no magnetization.

7. The heat assisted recording and reproduction method as set forth in claim 6, wherein:
the heated domain domains that exhibit highly restrained or no magnetization are specified not smaller than an area on the storage medium where the reproduction-use magnetic head can detect a magnetic field.

8. The heat assisted recording and reproduction method as set forth in claim 4, wherein
the plurality of heated domains are formed using a single heat source.

9. The heat assisted recording and reproduction method as set forth in claim 8, wherein:
the target temperature of the heated domain domains that exhibit highly restrained or no magnetization is specified based on a result of measurement of at least one of a jitter value, an error rate, and a signal level in a reproduction signal derived from the storage medium.

10. The heat assisted recording and reproduction method as set forth in claim 9, wherein:
the target temperature of the heated domain domains that exhibit highly restrained or no magnetization is specified based on evaluation of reproduction of information stored in an evaluation domain specified in advance on the storage medium.

11. The heat assisted recording and reproduction method as set forth in claim 7, wherein:
the target temperature of the domains that exhibit highly restrained or no magnetization is varied during standby for recording or reproduction.

12. The heat assisted recording and reproduction method as set forth in claim 4, wherein
target temperatures of the plurality of heated domains are varied individually.

13. The heat assisted recording and reproduction method as set forth in claim 12, wherein:
the target temperature of the heated domain domains that exhibit highly restrained or no magnetization is specified based on a result of measurement of at least one of a jitter value, an error rate, and a signal level in a reproduction signal derived from the storage medium.

14. The heat assisted recording and reproduction method as set forth in claim 4, wherein
the plurality of heated domains are formed using laser light.

15. The heat assisted recording and reproduction method as set forth in claim 4, wherein
a heated domain in the plurality of domains is heated by Joule heat generated by a resistant component in accordance with the magnetic compensation temperature.

16. The heat assisted recording and reproduction method as set forth in claim 4, wherein
the heated domain domains that exhibit highly restrained or no magnetization have a temperature specified lower than that of either the heated domains that exhibit a reduced coercive force or the heated domains that reproduce information from an orientation of the magnetization using the reproduction-use magnetic head and the heated domains that exhibit a reduced coercive force have a target temperature specified higher than the target temperature of the heated domains that reproduce information from an orientation of the magnetization using the reproduction-use magnetic head.

17. The heat assisted recording and reproduction method as set forth in claim 16, wherein
the heated domains that exhibit highly restrained or substantially no magnetization have a target temperature matched to the magnetic compensation temperature of the storage layer, the heated domains that exhibit a reduced coercive force have a target temperature matched to a temperature between the magnetic compensation temperature and a Curie point of the storage layer at which the storage layer exhibits a maximum saturated magnetization, and the heated domains that reproduce information from an orientation of the magnetization using a reproduction-use magnetic head have a target temperature matched to the Curie point of the storage layer.

18. The heat assisted recording and reproduction method as set forth in claim 4, wherein the magnetic compensation temperature is in a range between 40° C. and 100° C.

19. A heat assisted recording and reproduction method, using a magnetic storage medium including a recording domain exhibiting a magnetic compensation temperature higher than room temperature, whereby saturated magnetization of the recording domain has a maximum value at a temperature between the magnetic compensation temperature and a Curie point, said temperature being specified in a range from 150° C. to 250° C., wherein
when information recorded in the recording domain is reproduced using a head exhibiting magneto-resistance effect, a bias current applied to the head is altered according to a temperature of the recording domain.

20. The heat assisted recording and reproduction method as set forth in claim 19, wherein
the bias current is specified based on a result of measurement of at least one of a jitter value, an error rate, and a signal level in a reproduction signal derived from the magnetic storage medium.

21. The heat assisted recording and reproduction method as set forth in claim 19, wherein
the bias current is specified by reproducing information stored in an evaluation domain provided in advance in the recording domain.

22. The heat assisted recording and reproduction method as set forth in claim 21, wherein
a plurality of evaluation domains are provided.

23. The heat assisted recording and reproduction method as set forth in claim 21, wherein
the bias current is re-specified if a jitter value of a reproduction signal exceeds a predetermined value.

24. The heat assisted recording and reproduction method as set forth in claim 21, wherein
the bias current is re-specified if an error rate in a reproduction signal exceeds a predetermined value.

25. The heat assisted recording and reproduction method as set forth in claim 19, wherein the bias current is specified during standby for recording or reproduction.

26. The heat assisted recording and reproduction method as set forth in claim 19, wherein the bias current is specified if a predetermined temperature variation is detected in temperature in a neighborhood of a read-out domain in the recording domain.

27. The heat assisted recording and reproduction method as set forth in claim 19, wherein the bias current is specified based on a result of measurement of at least one of a jitter value, an error rate, and a signal level in a reproduction signal derived from the storage medium, the measurement being conducted at every certain time interval.

28. A heat assisted recording and reproduction method, using a magnetic storage medium including a recording domain exhibiting a magnetic compensation temperature higher than room temperature, whereby saturated magnetization of the recording domain has a maximum value at a temperature between the magnetic compensation temperature and a Curie point, said temperature being specified in a range from 150° C. to 250° C., wherein when information recorded in the recording domain is reproduced using a head exhibiting magneto-resistance effect, a bias current applied to the head is altered according to a temperature to which the recording domain is heated by the head generating heat.

* * * * *